(12) United States Patent
Kaechi

(10) Patent No.: US 11,747,831 B2
(45) Date of Patent: Sep. 5, 2023

(54) AGRICULTURAL FIELD MANAGEMENT SYSTEM, AND AGRICULTURAL FIELD MANAGEMENT METHOD

(71) Applicant: KUBOTA CORPORATION, Osaka (JP)

(72) Inventor: Shuya Kaechi, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 157 days.

(21) Appl. No.: 17/354,390

(22) Filed: Jun. 22, 2021

(65) Prior Publication Data

US 2021/0311501 A1 Oct. 7, 2021

Related U.S. Application Data

(63) Continuation of application No. 16/020,189, filed on Jun. 27, 2018, now Pat. No. 11,073,843.

(30) Foreign Application Priority Data

| Jul. 6, 2017 | (JP) | 2017-132901 |
| Jul. 6, 2017 | (JP) | 2017-132902 |
| Jul. 6, 2017 | (JP) | 2017-132903 |

(51) Int. Cl.
*G05D 1/10* (2006.01)
*B64C 39/02* (2023.01)
(Continued)

(52) U.S. Cl.
CPC ............ *G05D 1/101* (2013.01); *A01B 79/00* (2013.01); *A01B 79/005* (2013.01);
(Continued)

(58) Field of Classification Search
CPC ...... G05D 1/101; G05D 1/0094; A01B 79/00; A01B 79/005; B64C 39/024; G06Q 50/02;
(Continued)

(56) References Cited

U.S. PATENT DOCUMENTS 10,499,573 B1 * 12/2019 Paulsen ................ G01N 27/223
2012/0310599 A1 * 12/2012 Tanaka ................. A01B 79/005
702/189

(Continued)

FOREIGN PATENT DOCUMENTS

| JP | 2001120042 | 5/2001 |
| JP | 2002015386 | 1/2002 |

(Continued)

OTHER PUBLICATIONS

Seol et al., Apparatus for Prohibiting Steeling Corp Produce and Repelling Animals of Farm and the Method Thereof, Published Jun. 2019 (Year: 2019).*

(Continued)

*Primary Examiner* — Krishnan Ramesh
(74) *Attorney, Agent, or Firm* — Greenblum & Bernstein, P.L.C.

(57) ABSTRACT

An agricultural field management system includes a plurality of communication devices arranged in an agricultural field and configured to detect a physical quantity indicating dynamic movement of objects, a dispatcher arranged in the agricultural field and configured to communicate with each of the communication devices, a management apparatus configured to move in the agricultural field. Each of the communication devices is configured to generate first notification information indicating a danger the communication devices, and second notification information indicating an emergency having a urgency degree higher than the danger (Continued)

of the first notification information to the communication devices, defer to transmit the second notification information to the dispatcher until receiving activation information from the dispatcher, and transmit the second notification information to the dispatcher upon receiving the activation information. The dispatcher moves the management apparatus to the communication devices which transmits the first notification information or the second notification information.

10 Claims, 28 Drawing Sheets

(51) Int. Cl.
| | |
|---|---|
| G06Q 50/02 | (2012.01) |
| G05D 1/00 | (2006.01) |
| A01B 79/00 | (2006.01) |
| H04W 4/38 | (2018.01) |
| H04W 4/90 | (2018.01) |
| G08B 13/22 | (2006.01) |
| H04L 29/08 | (2006.01) |
| H04W 4/44 | (2018.01) |
| H04L 67/12 | (2022.01) |
| B64U 10/10 | (2023.01) |
| B64U 101/00 | (2023.01) |

(52) U.S. Cl.
CPC ......... *B64C 39/024* (2013.01); *G05D 1/0094* (2013.01); *G06Q 50/02* (2013.01); *H04W 4/38* (2018.02); *H04W 4/90* (2018.02); *B64U 10/10* (2023.01); *B64U 2101/00* (2023.01); *B64U 2201/10* (2023.01); *G08B 13/22* (2013.01); *H04L 67/12* (2013.01); *H04W 4/44* (2018.02)

(58) Field of Classification Search
CPC ........... H04W 4/38; H04W 4/90; H04W 4/44; B64U 10/10; B64U 2101/00; B64U 2201/10; G08B 13/22; H04L 67/12
USPC .......................................................... 701/3
See application file for complete search history.

(56) References Cited

U.S. PATENT DOCUMENTS

| | | | |
|---|---|---|---|
| 2016/0202227 A1* | 7/2016 | Mathur | A01B 79/005 |
| | | | 702/2 |
| 2017/0328854 A1* | 11/2017 | Paulsen | G01N 27/223 |
| 2017/0372137 A1* | 12/2017 | Kumar | H04N 13/25 |
| 2018/0068165 A1* | 3/2018 | Cantrell | A01M 31/002 |
| 2019/0265735 A1* | 8/2019 | Ishikawa | B64C 13/18 |

FOREIGN PATENT DOCUMENTS

| | | | | |
|---|---|---|---|---|
| JP | 2006042763 | | 2/2006 | |
| JP | 2013 25709 | A | 2/2013 | |
| JP | 2014 78150 | A | 5/2014 | |
| JP | 2015049863 | | 3/2015 | |
| JP | 6020872 | B1 | 11/2016 | |
| KR | 2017 0054808 | A | 5/2017 | |
| KR | 101740714 | B1 * | 6/2019 | ............ G08B 15/00 |
| WO | 2017/033761 | A1 | 3/2017 | |

OTHER PUBLICATIONS

Sukisaki et al., "Configuration of Sensor Group and Calibration Method in Drone Position Estimation System using Amplitude-modulated Pulse Light", The Institute of Electronics, Information and Communication Engineers vol. 116, No. 308, p. 157-158, dated Nov. 17-18, 2016, and along with English Translation thereof.

* cited by examiner

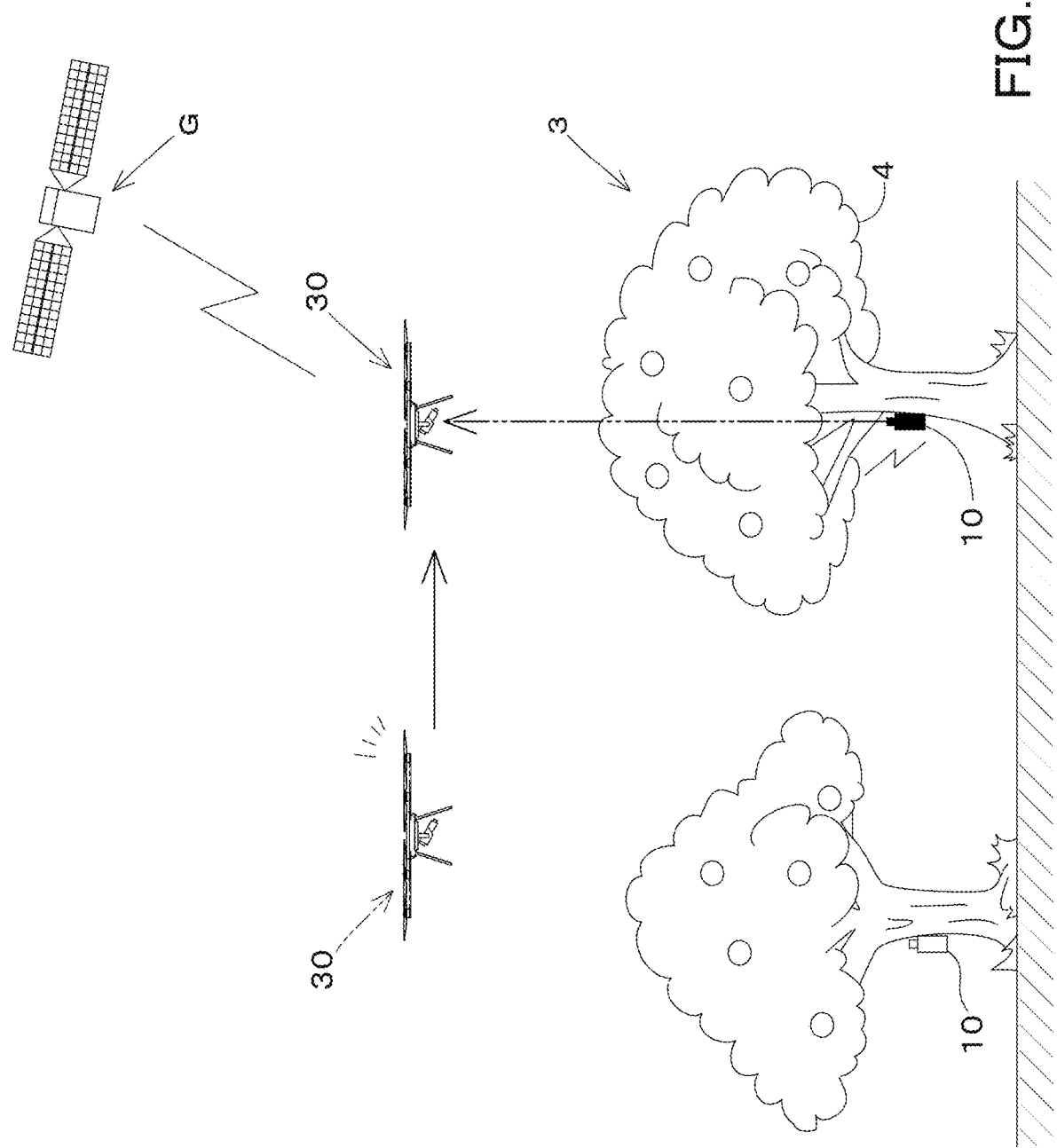

AGRICULTURAL FIELD MANAGEMENT SYSTEM, AND AGRICULTURAL FIELD MANAGEMENT METHOD

CROSS-REFERENCE TO RELATED APPLICATIONS

The present application is a continuation application of the U.S. patent application Ser. No. 16/020,189 filed on Jun. 27, 2018, which claims priority under 35 U.S.C. § 119 to Japanese Patent Application No. 2017-132901, filed Jul. 6, 2017, to Japanese Patent Application No. 2017-132902, filed Jul. 6, 2017, to Japanese Patent Application No. 2017-132903, filed Jul. 6, 2017. The contents of these applications are incorporated herein by reference in their entirety.

FIELD OF THE INVENTION

The present invention relates to an agricultural field management system, to an agricultural field management method, and a management machine in an agricultural field such as a farm, an agricultural field, an orchard, a rice paddy, and the like.

DISCUSSION OF THE BACKGROUND

There is conventionally a method disclosed in Japanese Unexamined Patent Application Publication No. 2001-120042 as a method of mapping a field such as a farm, a field, an orchard, a rice field, and the like. In the mapping system of Japanese Unexamined Patent Application Publication No. 2001-120042, a camera is mounted on an agricultural machine, an image of a field surface is continuously taken into a computer, a position and a direction of the image are obtained by using position information obtained from the GPS, a planar image and synthesized and displayed.

There are conventionally ones disclosed in Japanese Unexamined Patent Application Publication No. 2006-42763 and Japanese Unexamined Patent Application Publication No. 2002-15386 as crime prevention measures in fields such as farms, fields, orchards, paddy fields, and the like. In the electric fence of Japanese Unexamined Patent Application Publication No. 2006-42763, an intruder enters the fruit orchard by combining overhead wire metal fittings processed with wires and house fasteners, and by attaching combined overhead wire metal fittings and house fasteners to a frame pipe around the orchard is prevented.

In the surveillance system of Japanese Unexamined Patent Application Publication No. 2002-15386, a camera for photographing a desired range in an orchard is installed, and an image photographed by a camera is transmitted to a monitor at a remote place away from the orchard by communication means, the presence or absence of an intruder is judged.

There is conventionally a system disclosed in Japanese Unexamined Patent Application Publication No. 2015-49863 as a system for supporting agriculture in a field. The agricultural support system of Japanese Unexamined Patent Application Publication No. 2015-49863 includes a crop plan setting means for setting a crop plan relating a field to crops to be planted and a crop plan setting means for setting a crop plan to correlate the field with the crops to be planted, And work plan setting means for setting the work.

SUMMARY OF THE INVENTION

An agricultural field management system includes a plurality of communication devices arranged in an agricultural field. Each of the communication devices includes a physical quantity detecting circuit to detect a physical quantity, and an outputting circuit to output notification information based on the physical quantity detected by the physical quantity detecting circuit. The agricultural field management system also includes a third obtaining circuit to obtain the notification information, a calling judging circuit to judge, based on the notification information, whether to call a management machine movable in the agricultural field, and a calling circuit to call the management machine.

An agricultural field management method includes detecting a physical quantity indicating dynamic movement of people, animals and objects by means of a plurality of communication devices arranged in an agricultural field, communicating between each of the communication devices and a dispatcher, communicating between the dispatcher and a management apparatus, generating by means of each of the communication devices, first notification information indicating a danger to each of the communication devices based on the detected physical quantity, transmitting the first notification information from each of the communication devices to the dispatcher, generating by means of each of the communication devices, second notification information indicating an emergency having a urgency degree higher than the danger of the first notification information to each of the communication devices based on the detected physical quantity, deferring to transmit the second notification information to the dispatcher until receiving activation information from the dispatcher, transmitting the second notification information to the dispatcher upon receiving the activation information, and moving the management apparatus to the communication devices which transmits the first notification information or the second notification information.

The dispatcher may receive a combination of the first notification information and/or the second notification information transmitted from the communication devices, and move the management apparatus based on the combination of the first notification information and/or the second notification information to the communication devices.

The dispatcher may be configured, upon receiving the activation information, to request for connection with one or more of the communication devices from which the second notification information is not transmitted, and the one or more of the communication devices requested for connection increase power of the second notification information and to transmit the second notification information to the dispatcher.

The second notification information from one or more of the communication devices indicates that the one or more of the communication devices is being taken away or destroyed.

The agricultural field management system may further include a server configured to communicate with the dispatcher and management apparatus, wherein the server transmits the activation information. Alternatively, The agricultural field management system may further include a mobile terminal configured to communicate with the dispatcher and management apparatus, wherein the mobile terminal transmits the activation information.

The dispatcher may be configured to obtain positioning information of each of the communication devices.

The management apparatus may be configured to capture moving images around the communication devices after moving thereto. Also, the management apparatus may be a multicopter configured to fly above the agricultural field.

DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 3C is a fourth view illustrating the movement of the management machine in the mapping mode according to the first embodiment;

DESCRIPTION OF THE EMBODIMENTS

Figure 1:
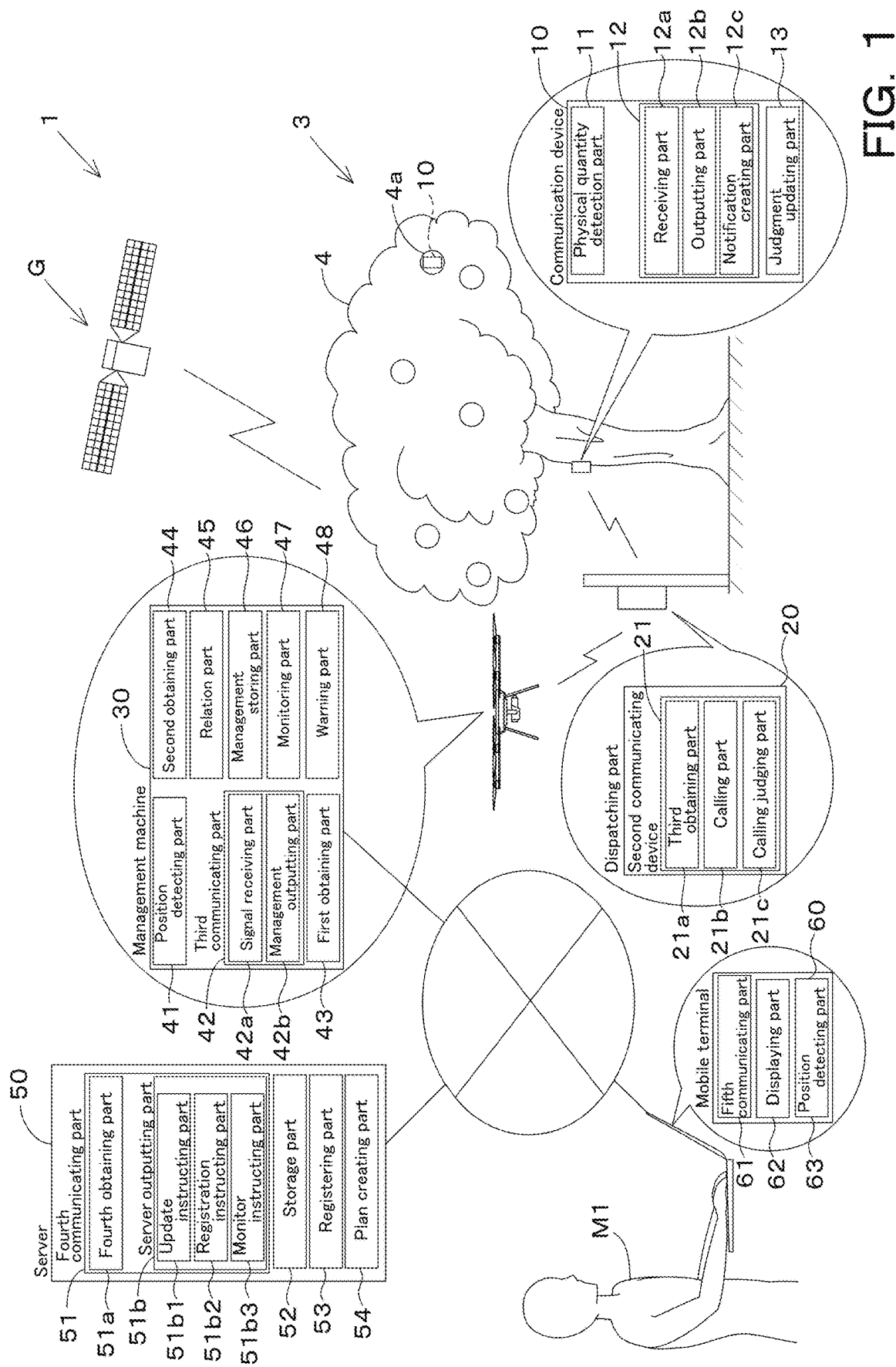
FIG. 1 is a view illustrating an overall of an agricultural field management system according to a first embodiment of the present invention.

The embodiments will now be described with reference to the accompanying drawings, wherein like reference numerals designate corresponding or identical elements throughout the various drawings. The drawings are to be viewed in an orientation in which the reference numerals are viewed correctly.
Hereinafter, embodiments of the present invention will be described with reference to the drawings.

First Embodiment

FIG. 1 is an overall view of a field management system 1 according to the first embodiment. The field management system 1 is a system for monitoring the field 3. For example, in the field management system 1, a communication device 10 having a physical quantity detection part 11 is installed in a field 3, and when a physical abnormality such as intrusion into the field 3 is detected by the physical quantity detection part 11, management of multicopter etc. When the machine 30 reaches the field 3, abnormality can be confirmed.

As shown in FIG. 1, the field management system 1 includes a plurality of communication devices 10 and a dispatching part 20. A plurality of communication apparatuses 10 are installed in the field 3. For example, in the field 3, a plurality of fruit trees 4 are planted, and the communication device 10 is installed in each of the fruit trees 4 to be monitored. The communication device 10 may be embedded in the entrance and exit of the field 3, on a different ground or wall from the monitored object, or may be disguised as the fruit 41 (as the fake fruit 4a).

In such a case, the communication device 10 may be installed separately from the camouflaged fruit 4a and the camouflaged fruit 4a, or only one of them may be installed. The communication device 10 is operated by a power source such as a dry cell battery, a button battery, a solar cell, a secondary battery or the like built in the communication device 10. The communication device 10 may be operated by an external power source.

The dispatching part 20 is capable of communicating with the plurality of communication devices 10 and the management device 30, and is a device that performs processing relating to the dispatch of the management device 30. In this embodiment, the dispatching part 20 is a device that performs processing relating to dispatch of the management machine 30, but may be a relay device that relays communication between the communication device 10 and the management device 30, or may be a communication device 10 and the server 50, or may be a relay device that relays communication between the mobile terminal 60 or the like and another device.

Next, the communication device 10 will be described in detail.

The communication device 10 includes a physical quantity detection part 11, a first communication part 12 and a determination updating part 13. The physical quantity detection part 11 includes an acceleration sensor, a strain gauge, a light sensor, a magnetic sensor and the like, and is a device capable of detecting dynamic movement of people, animals, objects, and the like. The communication device 10 has one or more physical quantity sensors as described above.

The first communication part 12 is a device that performs wireless communication with the dispatching part 20 and the management machine 30. The first communication part 12 is a device that performs short distance or long distance communication. For example, the first communication part 12 wirelessly communicates with the dispatching part 20 and the management machine 30 by Bluetooth (registered trademark) Low Energy or the like in the Bluetooth (registered trademark) specification of the communication standard IEEE 802.15.1 series. Hereinafter, for convenience of description, Bluetooth (registered trademark) Low Energy is referred to as "BLE".

The first communication part 12 includes a reception part 12a, an output part 12b, and a notification generation part 12c. The reception part 12a, the output part 12b, and the notification creation part 12c are composed of electric/electronic parts, a program stored in the first communication part 12 and the like.

The receiving part 12a performs processing such as a switching instruction to the mapping mode output from the management device 30, an instruction to increase the radio wave output of the output part 12b output from the dispatching part 20, and the like. The output part 12b performs processing such as outputting identification information of the communication device 10 and notification information based on the physical quantity acquired by the physical quantity detection part 11.

The identification information is information for identifying the communication device 10, and is unique information allocated to each communication device 10. Incidentally, the radio wave is, for example, a broadcast signal such as a beacon.

The notification creation part 12c determines whether to notify the dispatching part 20 based on the physical quantity acquired by the physical quantity detection part 11 and the notification determination condition. The notification creation part 12c creates notification information based on the identification information of the communication device 10 and the physical quantity acquired by the physical quantity detection part 11. In the following description, the physical quantity and notification information detected by the physical quantity detection part (physical quantity sensor) 11 may be referred to as detection information.

The notification creation part 12c has a notification determination condition based on a predetermined threshold value in advance. More specifically, for example, the notification determination condition includes a first condition (semi-danger), a second condition (danger), a third condition (emergency), and a fourth condition (ERROR). Here, it is assumed that the physical quantity detected by the physical quantity detection part 11 is F, and the predetermined thresholds are F1, F2, and F3.

The first condition is a condition ($F1 \leq F \leq F2$) when the physical quantity F detected by the physical quantity detection part 11 is not less than a predetermined threshold value F1 and not more than F2. The second condition is a condition ($F2 < F \leq F3$) when the physical quantity F detected by the physical quantity detection part 11 is larger than F2 and not more than a predetermined threshold F3.

The third condition is a condition ($F3 < F$) when the physical quantity F detected by the physical quantity detection part 11 is larger than F3. The fourth condition is a condition such as when the physical quantity F detected by the physical quantity detection part 11 does not change from 0 or does not change from the maximum value or the voltage of the power supply provided in the communication device 10 is smaller than a predetermined voltage value.

When the conditions from the first condition to the fourth condition are not satisfied, the notification creation part 12c determines not to notify.

In the present embodiment, under the first condition and the second condition, the second condition is a condition with a high degree of urgency. Under the second condition and the third condition, the third condition is a condition with a high degree of urgency. The third condition is a condition having a particularly high degree of urgency, for example, a condition for notifying the server 50 etc. immediately before the communication device 10 is taken away or destroyed.

The fourth condition is a condition for notifying failure of the communication device 10, necessity of power supply replacement, or the like. In the present embodiment, the notification determination condition is four conditions from the first condition to the fourth condition, but may be three or less, or five or more conditions.

Further, when the communication apparatus 10 includes a plurality of physical quantity detection parts 11, the notification determination condition may be a condition based on a combination of physical quantities detected by the plurality of physical quantity detection parts 11. Also, conditions based on conditions such as elapsed time may be used.

The judgment updating part 13 updates the notification judgment condition when there is an instruction (update instruction) for updating the notification judgment condition from the dispatching part 20 or the management machine 30. In the present embodiment, the values of the predetermined thresholds F1, F2, F3 are changed. It should be noted that the update of the notification determination condition may be performed by adding not only the notification determination condition previously registered but also a new notification determination condition.

The notification creation part 12c creates notification information based on the determination result. More specifically, when the first condition is included, the notification creation part 12c creates first notification information. When the second condition is included, the notification creation part 12c creates the second notification information. When the third condition is included, the notification creation part 12c creates the third notification information. In the case where the fourth condition is included, the fourth notification information is created.

The dispatching part 20 is installed within a range in which it can communicate with the communication device 10. That is, it is installed in the field 3 or around the field 3 and the like. The dispatching part 20 includes a second communication part 21. The second communication part 21 is a device that performs wireless communication with the communication device 10, the management device 30, the server 50, and the portable terminal 60.

The second communication part 21 wirelessly communicates with the server 50 and the mobile terminal 60 by, for example, Wi-Fi (Wireless Fidelity (registered trademark)) of the IEEE 802.11 series which is a communication standard. Further, for example, the second communication part 21 performs wireless communication with the communication device 10 and the management device 30 by BLE or the like.

The second communication part 21 includes a third acquisition part 21a, a call part 21b, and a call determination part 21c. The third acquisition part 21a, the calling part 21b, and the call determination part 21c are configured by electric/electronic parts, a program stored in the second communication part 21 and the like.

The third acquiring part 21a acquires notification information output by the output part 12b and an instruction to update the notification determination condition output by the server 50.

The calling part 21b outputs the call information created by the call determination part 21c by wireless communication such as BLE.

Based on the notification information acquired by the third acquisition part 21a, the call determination part 21c determines whether or not to call the management machine 30.

The call determination part 21c creates call information based on the notification information output by the plurality of output parts 12b. In the call determination part 21c, a call condition based on a combination of notification information is stored.

Specifically, the call determination part 21c determines the communication device 10 that is highly required to call the management device 30. When the acquired physical quantity satisfies the calling condition, the call determining part 21c instructs the calling part 21b to output the call information.

In the present embodiment, the third obtaining part 21a, the call determining part 21c, and the calling part 21b are provided in the dispatching part 20, but they may be provided in the server 50.

Next, the management machine 30 will be described in detail.

Figure 11:
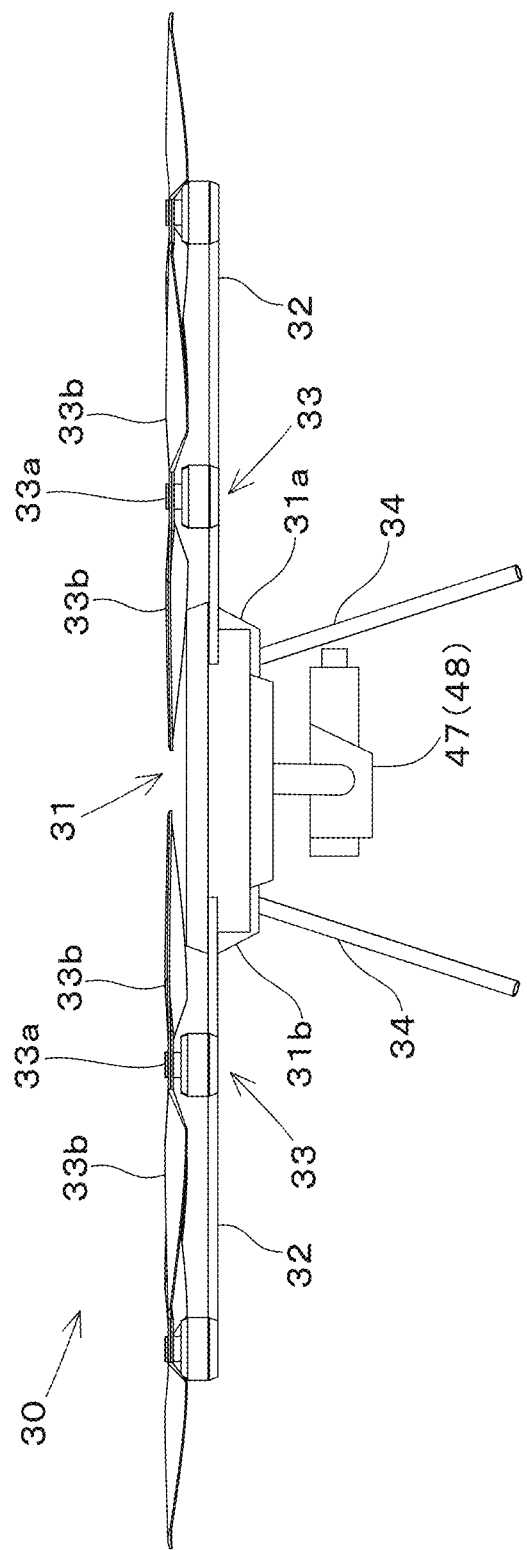
FIG. 11 is a view illustrating a side surface of an overall of the management machine according to the first embodiment.

As shown in FIG. 11, the management machine 30 is a rotary wing machine capable of flying unmanned by a plurality of rotary blades 33 and is, for example, a flying body called a multicopter (drone). The management machine 30 can fly by autonomous control without depending on the remote device. Incidentally, the management machine 30 may not have a flying object, but may have a moving means such as a crawler or the like moving on the ground.

Figure 12:
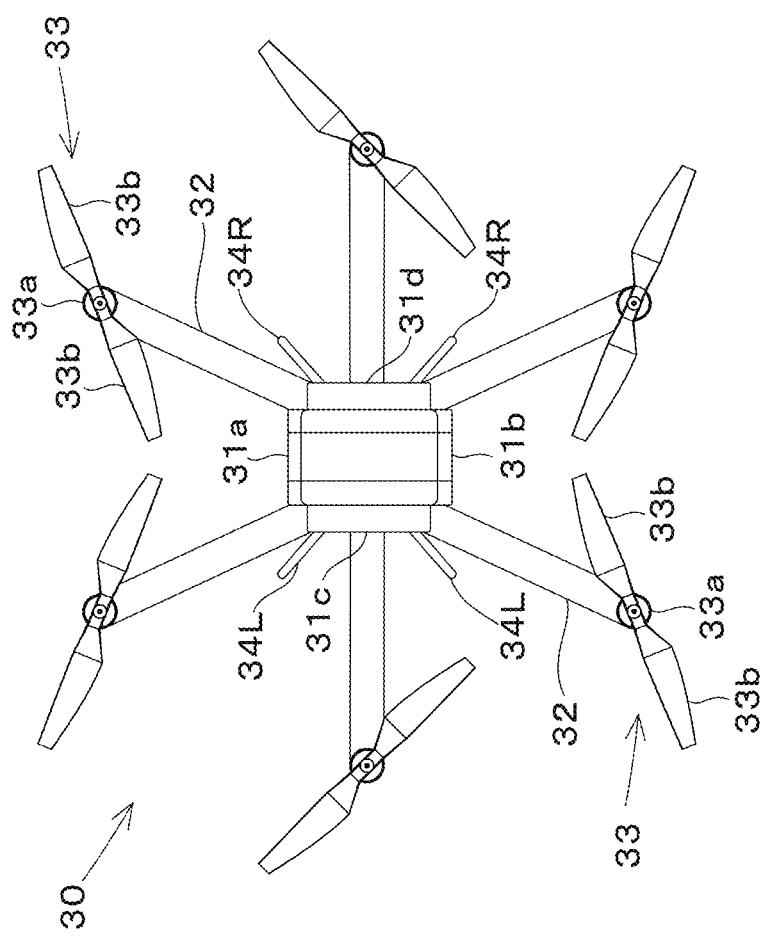
FIG. 12 is a view illustrating a plan surface of an overall of the management machine according to the first embodiment.

The management machine 30 has a main body 31 an arm 32, a rotary wing 33 and a skid 34 as shown in FIG. 12, the main body 31 includes a first edge portion (front edge) 31a, a second edge portion (rear edge) 31b, a third edge portion (left edge) 31c, a fourth edge portion And an edge) 31d.

The first edge portion 31a is positioned on one side in top view. The second edge portion 31b is located on the opposite side (the other side) to the first edge portion 31a in top view. The third edge portion 31c is located at one end side in a direction orthogonal to the straight line connecting the first edge portion 31a and the second edge portion 31b (the direction orthogonal to the one side and the other side). The fourth edge portion 31d is located on the side opposite to the third edge portion 31c.

For convenience of description, the first edge portion 31a side is referred to as the front side, the second edge portion 31b side as the rear side, the third edge portion 31c side as the left side, and the fourth edge portion 31d side as the right side. A direction from the first edge portion 31a side toward the second edge portion 31b or from the second edge portion 31b side toward the first edge portion 31a side is referred to as a front-rear direction, and a direction orthogonal to the front-rear direction is referred to as a width direction. Also, a direction in the width direction approaching the center in the width direction of the main body 31 is referred to as a width direction inner side, and a direction in a width direction that is away from the center in the width direction of the main body 31 is referred to as a width direction outer side.

Although the shape (outer shape) of the main body 31 is a substantially rectangular parallelepiped shape in the case of this embodiment, it may be another shape such as a disk shape or the like. The shapes of the first edge portion 31a to the third edge portion 31c change according to the shape of the main body 31. Therefore, the shapes of the first edge portion 31a to the third edge portion 31c may be linear, or may be partially or entirely curved in shape.

As shown in FIG. 12a plurality of arms 32 are attached to the main body 31. In the present embodiment, six arms 32 are attached to the main body 31. The six arms 32 extend radially from the center of the main body 31 in a horizontal plane (a plane parallel to the ground in the landing state).

However, the number of the arms 32 is not limited to six, and may be seven or more, or five or less. Further, the arm 32 may be configured to be foldable toward the main body 31 side.

The proximal end side of the arm 32 is attached to the main body 31. Rotor blades 33 are attached to the distal end sides of the plurality of arms 32, respectively.

The rotor blades 33 generate lift for the management machine 30 to fly. The rotor blades 33 are composed of a rotor 33a and a blade (propeller) 33b. The rotor 33a is composed of an electric motor (DC motor or the like). The rotor 33a is driven by electric power supplied from a battery. A blade 33b is attached to the upper part of the rotary shaft of the rotor 33a. Adjacent rotary blades 33 rotate in opposite directions to each other.

The number of rotor blades 33 is not particularly limited, and can be changed according to required lift or the like. For example, the management machine 30 may be a tricotter having three rotating blades 33a quad-cotter having four rotating blades 33, or a hexacopter having six rotating blades 33, Or it may be an octocope having eight rotating blades 33.

The skid 34 is installed when the management machine 30 lands and supports the main body 31 on the ground. As shown in FIG. 12, the skid 34 has a skid 34L provided on the third edge portion 31c side (left side) of the main body 31 and a skid 34R provided on the fourth edge portion 31d side (right side) are doing.

Further, the management machine 30 has a position detection part (position detection device) 41. The position detection part 41 is a device that detects its own position (positioning information including latitude and longitude) with a satellite positioning system (Global Positioning System, Galileo, GLONASS, etc.).

The position detection part 41 receives a signal (GPS satellite position, transmission time, correction information, etc.) transmitted from a positioning satellite (for example, a GPS satellite) G and calculates its own position (for example, Latitude, longitude) are detected.

In addition, the management device 30 has a third communication part 42. The third communication part 42 is a device that the management device 30 performs wireless communication with the communication device 10 and the server 50. The third communication part 42 includes a signal receiving part 42a and a management output part 42b. The third communication part 42 performs wireless communication with the server 50 by Wi-Fi or the like.

Further, for example, the third communication part 42 performs wireless communication with the communication device 10 by BLE or the like. Further, the third communication part 42 wirelessly communicates with the server 50 by, for example, a mobile phone communication network, a data communication network, a cellular phone communication network, or the like.

The third communication part 42 includes a signal receiving part 42a and a management output part 42b. The signal receiving part 42a and the management output part 42b are composed of electric/electronic parts and the like. The management output part 42b outputs an instruction to the communication device 10 by radio communication such as BLE.

In addition, the management output part 42b outputs the association information associating the identification information and the positioning information to the server 50. The signal receiving part 42a obtains identification information output by the output part 12b of the communication device 10 installed in the field 3, field information output from the server 50, and the like.

The field information is, for example, information for specifying a field and is information including position information (latitude and longitude) of the field. Note that the field information may include information other than the position information as long as the information specifies the field.

The management device 30 includes a first acquisition part 43, a second acquisition part 44 an association part 45, a management storage part 46, a monitoring part 47, and a warning part 48. The first acquiring part 43, the second acquiring part 44 and the associating part 45 are constituted by programs and the like stored in the management machine 30 and the like.

In other words, the management machine 30 has a control device composed of a CPU or the like, and the first obtaining part 43, the second obtaining part 44 and the associating part 45 are constituted by programs and the like stored in the control device ing.

The first acquisition part 43 is a device that acquires identification information of the communication device 10 received by the signal reception part 42a, and the second acquisition part 44 acquires positioning information (latitude and longitude) detected by the position detection part 41.

The associating part 45 associates the identification information acquired by the first obtaining part 43 with the positioning information acquired by the second obtaining part 44.

The management storage part 46 is composed of a non-volatile memory or the like and stores field information and instruction information received from the server 50. The monitoring part 47 is a device that monitors an intruder M2 or an animal or the like that has invaded the field 3. More specifically, it is a camera that images the intruder M2 and the like.

The camera that images the intruder M2 or the like may be a camera that captures a still image or a video camera that captures a moving image, and may be similar to this.

The warning part 48 is an alarm device that issues a warning by, for example, a warning sound. The warning part 48 is not limited to an alarm device that warns with a warning sound, and may be a device that warns with light.

Hereinafter, the server 50 will be described.

The server 50 includes a fourth communication part 51, a storage part 52, and a registration part 53. The fourth communication part 51 is a device that the server 50 performs radio communication with the management machine 30, the dispatching part 20, and the portable terminal 60. The fourth communication part 51 wirelessly communicates with the dispatching part 20, the management machine 30, and the portable terminal 60, for example, by Wi-Fi or the like.

Further, for example, the fourth communication part 51 performs radio communication with the dispatching part 20 and the management machine 30 by BLE or the like. Further, the fourth communication part 51 performs radio communication with the dispatching part 20, the management device 30, and the portable terminal 60, for example, by a mobile phone communication network, a data communication network, a mobile phone communication network, or the like.

The fourth communication part 51 includes a fourth acquisition part 51a and a server output part 51b. The fourth obtaining part 51a and the server output part 51b are composed of electric/electronic parts, programs stored in the fourth communication part 51, and the like.

The fourth obtaining part 51a can receive the output of the calling part 21b, the output of the management output part 42b, and the output of the mobile terminal 60. Specifically, the fourth acquiring part 51a acquires the call information output by the calling part 21b, the association information in which the identification information of the communication device 10 and the positioning information of the communication device 10 are associated with each other.

The server output part 51b includes an update instructing part 51b1, a registration instructing part 51b2, and a monitoring instructing part 51b3. The update instructing part 51b1, the registration instructing part 51b, and the monitoring instructing part 51b3 are constituted by programs and the like stored in the server 50.

The update instructing part 51b1 performs a process of transmitting an update instruction of the notification determination condition to the dispatching part 20 or the management machine 30. The registration instructing part 51b2 and the monitoring instructing part 51b3 perform an instruction process to the management machine 30 via the communication means (signal receiving part 42a) of the management machine 30.

When the monitoring instructing part 51b3 transmits the information such as the identification information of the communication device 10 and the positioning information to the management device 30, it instructs the monitor action.

The storage part 52 is composed of a nonvolatile memory or the like, and stores field information, work plan information, and the like acquired by the fourth acquisition part 51*a*. The storage part 52 may store the field information in advance as well as the field information acquired by the fourth acquisition part 51*a*.

The registration part 53 associates the association information (positioning information, identification information) acquired by the fourth acquisition part 51*a* with the information of the field 3 and registers it in the storage part 52.

The mobile terminal 60 is a relatively high calculation capability. The mobile terminal 60 includes a fifth communication part 61, a display part 62, and a position detection part (position detection device) 63.

The fifth communication part 61 is a device that performs wireless communication with the dispatching part 20 and the server 50. The fifth communication part 61 performs wireless communication with the dispatching part 20 and the server 50, for example, by Wi-Fi or the like. The fifth communication part 61 may perform wireless communication with the dispatching part 20 or the server 50 via a data communication network, a cellular phone communication network, or the like. The fifth communication device 61 transmits to the dispatching part 20 and the server 50 a signal (activation information) for causing the communication device 10 to return from a stealth mode to be described later.

The display part 62 can display a screen as shown in FIGS. 14 to 19. It is possible to display the monitoring screen Q2 or the like based on the home screen Q1 or the field information received from the server 50 by the fifth communication part 61. That is, the detection information and the information of the field 3 can be displayed.

The position detection part 63 is a device that detects its own position (positioning information) by the satellite positioning system. The position detection part 63 receives a signal transmitted from the positioning satellite G, and detects its own position (for example, latitude and longitude) based on the received signal. That is, an operator who works in the field possesses the portable terminal 60 at the time of work, thereby detecting the position of the worker at the time of work.

The field management system 1 has a communication device installation location registration mode (mapping mode), a monitoring mode (abnormality detection mode), and a determination condition update mode.

Hereinafter, the mapping mode, the monitoring mode, and the determination condition update mode will be described in detail.

Figure 14:
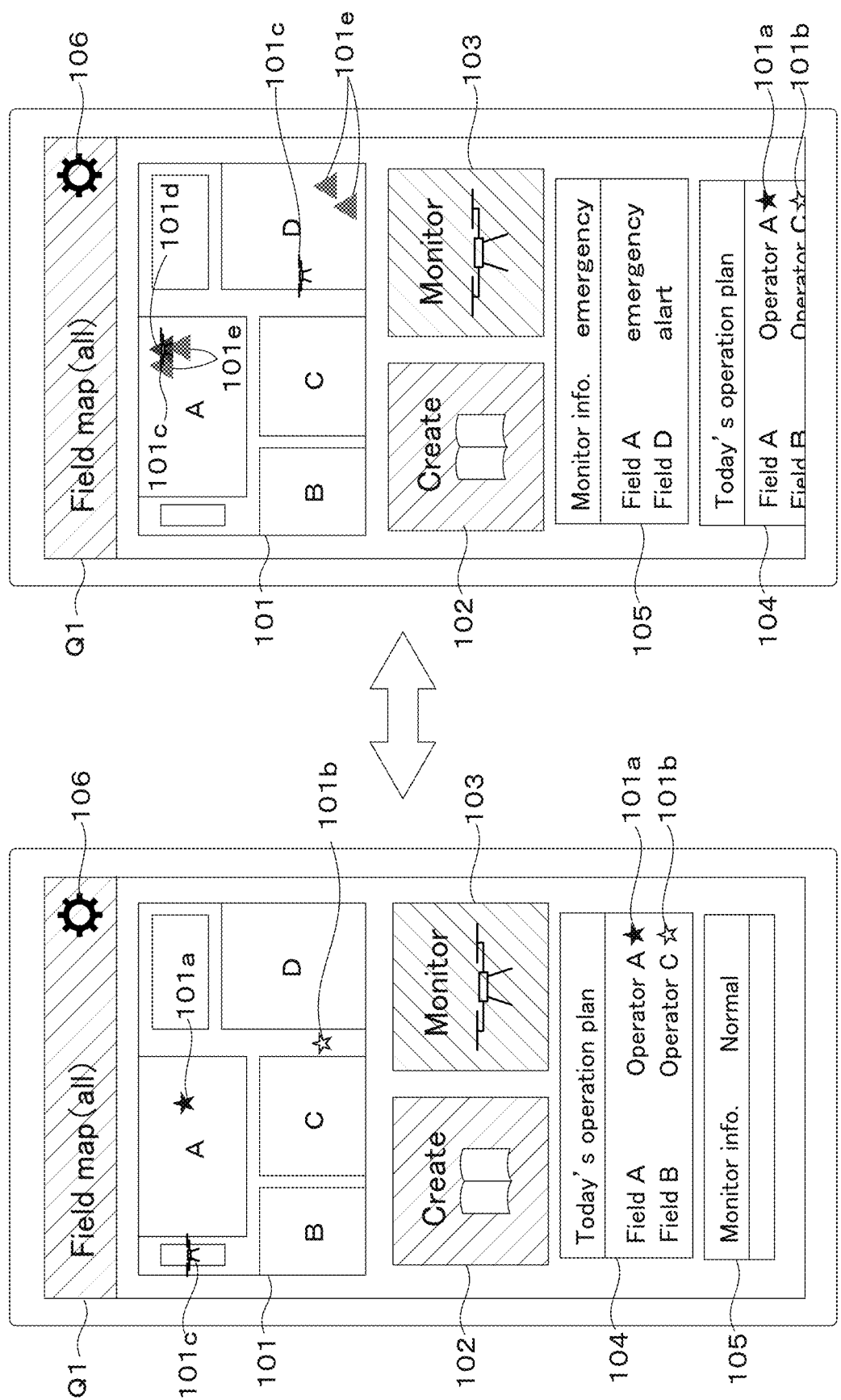
FIG. 14 is a view illustrating a home screen of a case where a management machine is not called and a view illustrating the home screen of a case where a management machine is called according to the second embodiment.

The mapping mode is a mode in which the installation location of the communication device 10 installed in the field 3 is measured and the positioning information is registered in the server 50. A switching instruction (field registration instruction) from the mobile terminal 60 to the mapping mode is performed by operating the portable terminal 60. Specifically, as shown in FIG. 14, the creation button 102 provided on the home screen Q1 is selected (tapped).

Figure 16A:
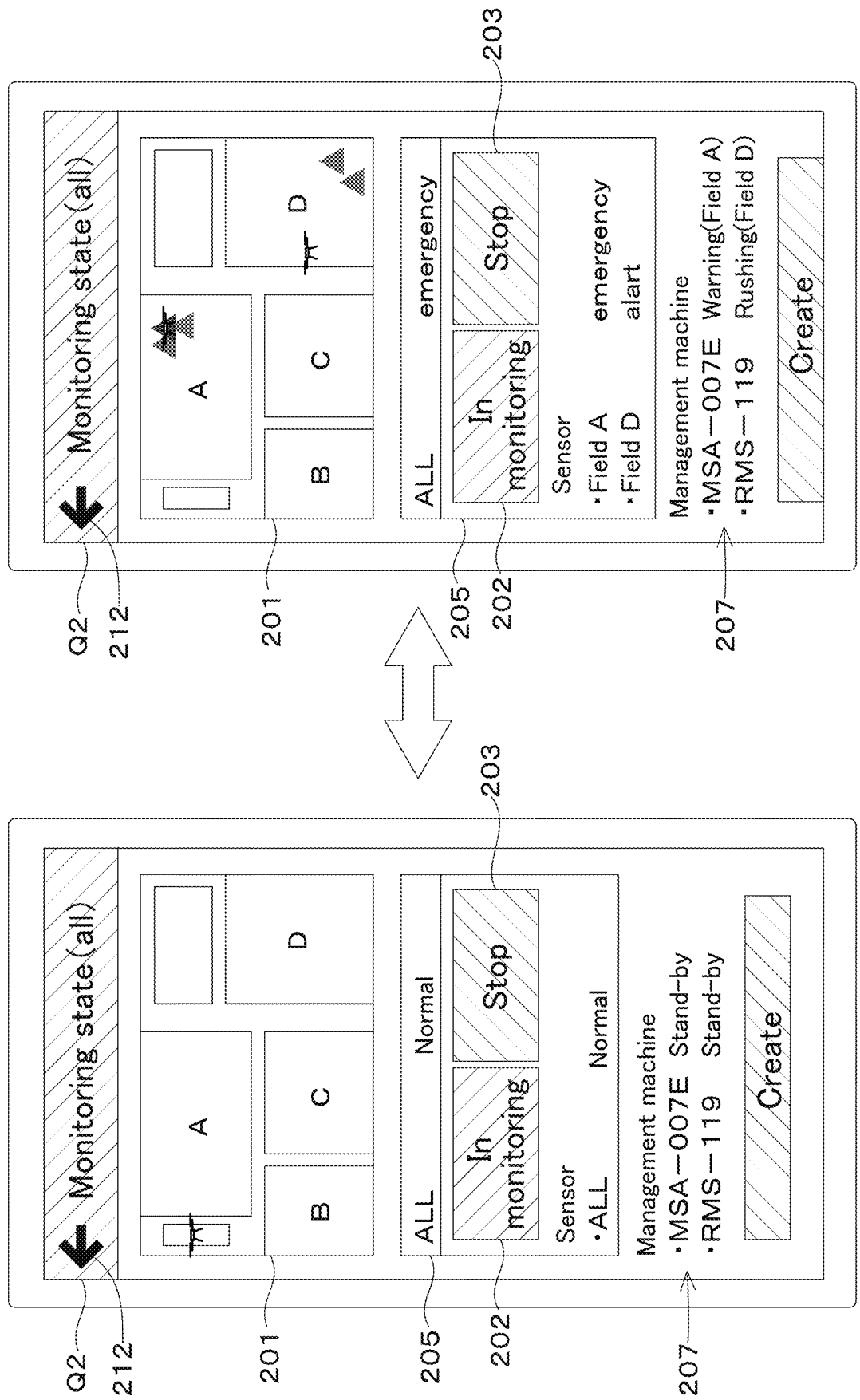
FIG. 16A is a view illustrating a monitoring state screen for all of the case where the management machine is not called and a view illustrating the monitoring state screen for all of the case where the management machine is called according to the second embodiment.
Figure 20:
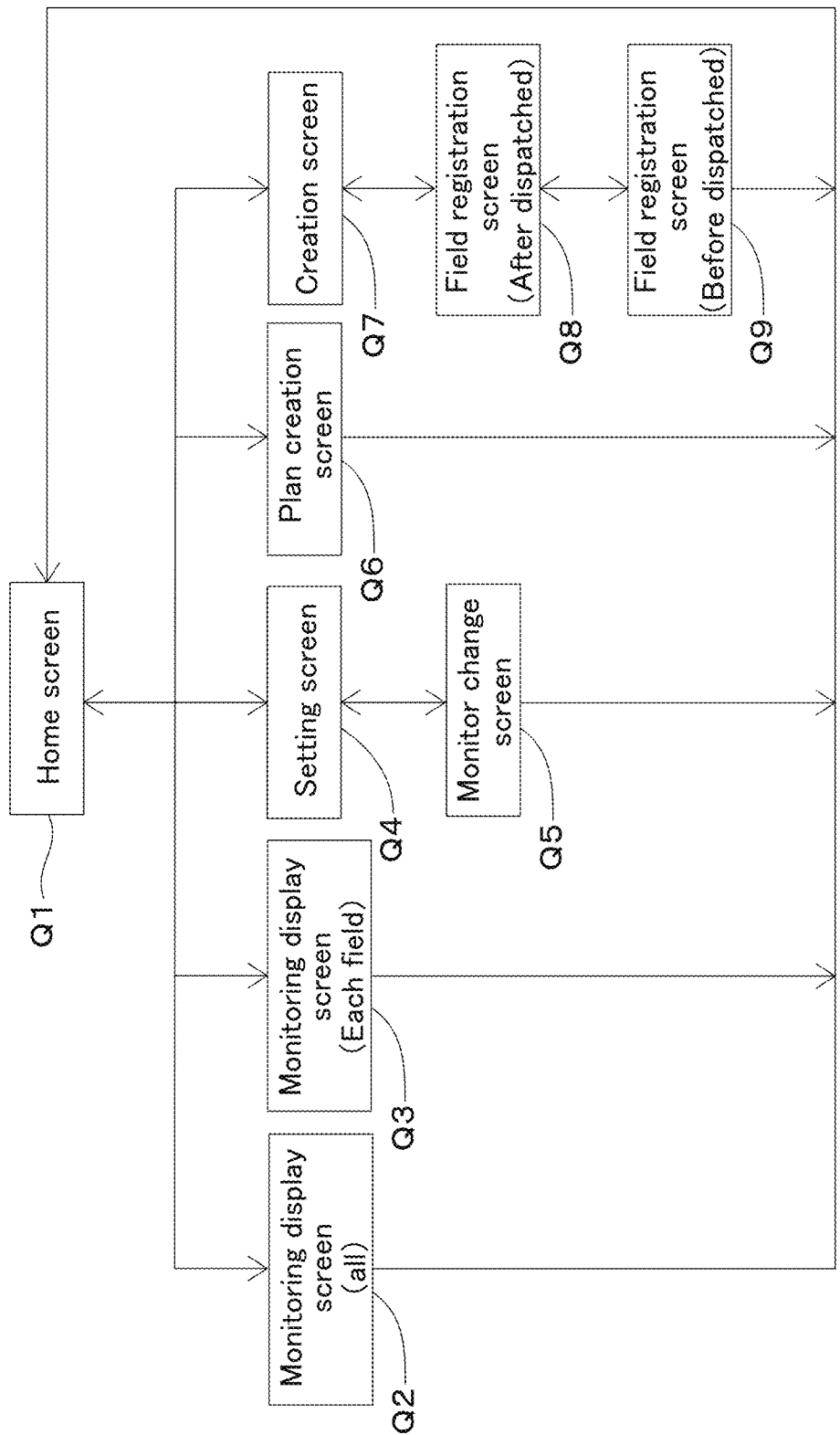
FIG. 20 is a view illustrating a transition of switching of each types of .display screens according to the second embodiment.

When the monitoring button 103 is selected, as shown in FIG. 20, the screen display of the display part 62 transitions to display a monitoring state screen Q2 as shown in FIG. 16A. The field map 201 is displayed on the upper part of the monitoring situation screen Q2. On the field map 201, a map around the field is displayed based on the field information stored in the storage part 52 of the server 50. For example, "Field A", "Field B", "Field C", and "Field D" are displayed in FIG. 16A.

Figure 16B:
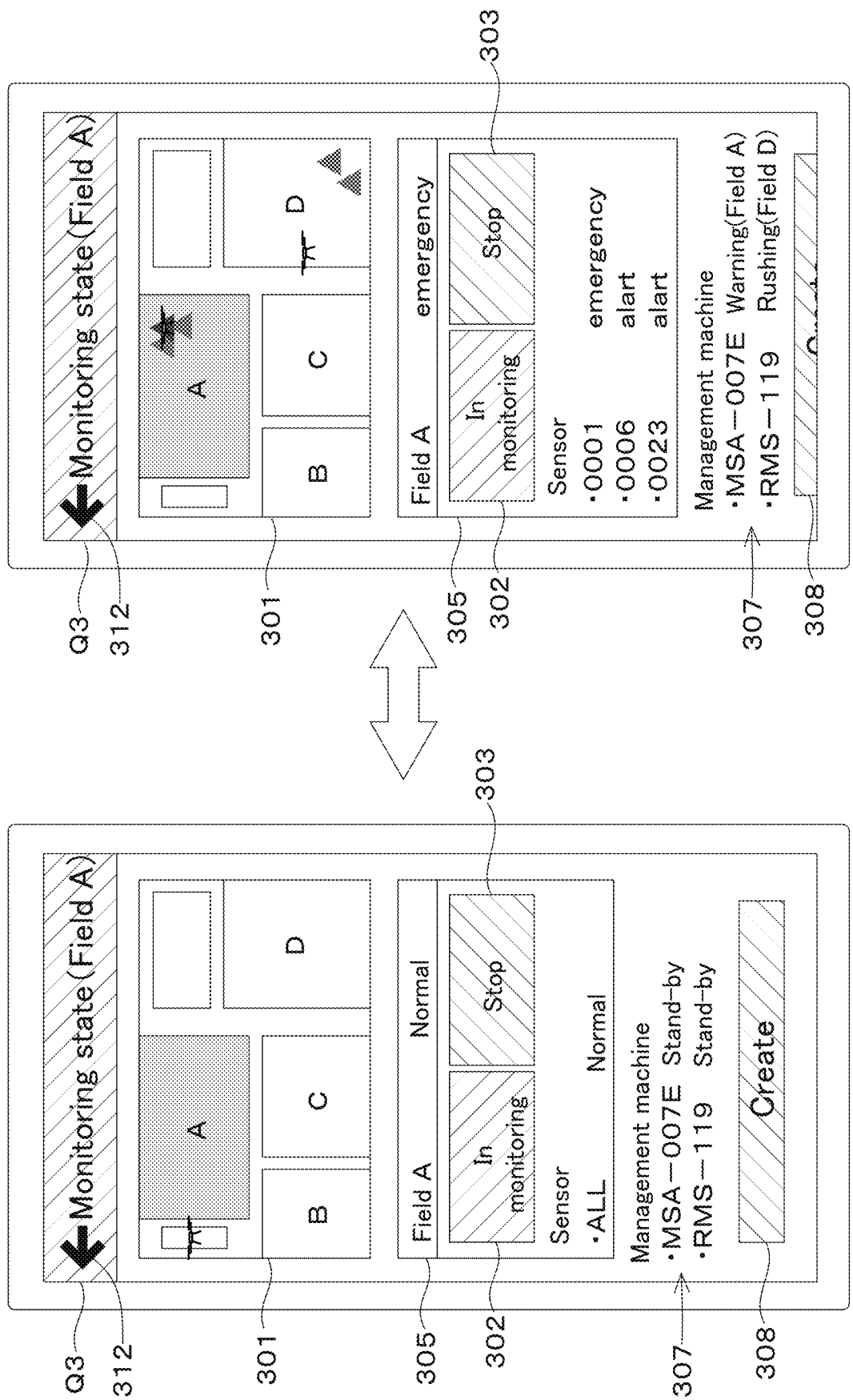
FIG. 16B is a view illustrating a monitoring state screen for an agricultural field A of the case where the management machine is not called and a view illustrating the monitoring state screen for the agricultural field A of the case where the management machine is called according to the second embodiment.

When any one of the fields 3 displayed on the field map 201 is selected, as shown in FIG. 20, the screen display of the display part 62 transitions and the monitoring situation screen Q3 of each field is displayed. When the creation button 308 arranged at the bottom of the monitoring situation screen Q3 of each field as shown in FIG. 16B is selected, a field registration instruction is transmitted from the mobile terminal 60 to the server 50.

Figure 10:
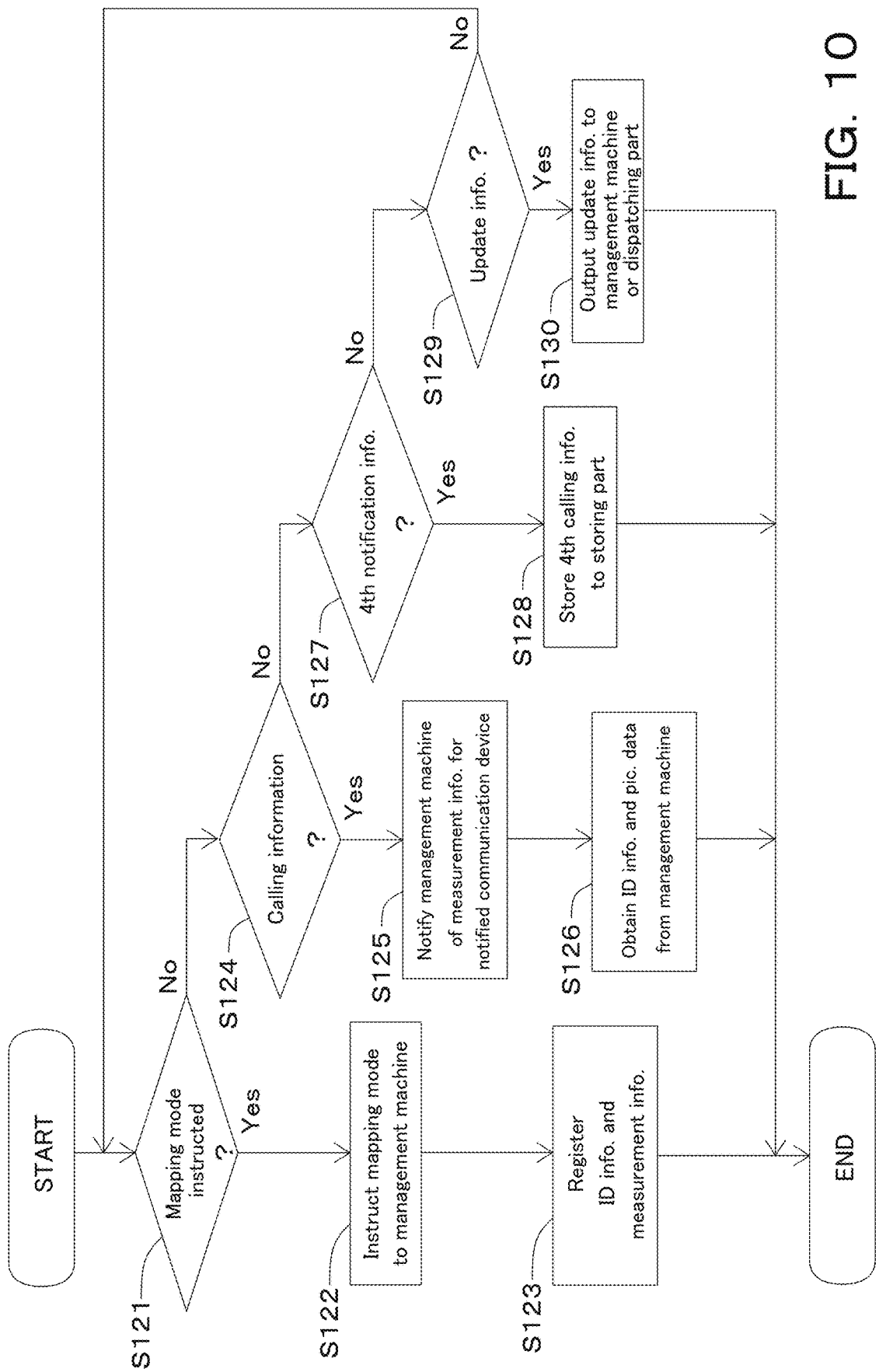
FIG. 10 is a view illustrating a sequential movement of a server according to the first embodiment.

As shown in FIG. 10, when the server 50 determines that a field registration instruction has been received from the mobile terminal 60, the registration instruction part 51*b*2 instructs the management machine 30 to switch to the mapping mode. As shown in FIG. 20, when the switching instruction to the mapping mode is completed, the display part 62 of the portable terminal 60 displays the home screen Q1.

When determining that the switching instruction to switch to the mapping mode is received from the server 50, the management machine 30 checks whether field information is stored in the management storage part 46. When the field information is not stored in the management storage part 46, the management machine 30 requests the server 50 to transmit the field information. In response to a request from the management machine 30, the server 50 transmits the field information stored in the storage part 52 of the server 50.

The management machine 30 moves to the field 3 based on the acquired field information or the field information stored in advance in the management storage part 46 and the positioning information detected by the position detection part 41. As shown in FIG. 2B, the management machine 30 moves within the field 3 after moving to the field 3. The management device starts detecting the identification information outputted by the communication device 10.

After starting, the communication device 10 initializes the transmission power of the output part 12 and outputs the identification information 1). Further, the communication device 10 initializes the notification determination condition. The physical quantity detection part starts detecting the physical quantity.

When acquiring the identification information outputted by the communication device 10, the management device 30 determines whether there is a communication device that outputs unregistered identification information based on the acquired field information or the field information stored in the management storage part 46 to decide.

The management device 30 requests connection to the communication device 10 that outputs unregistered identification information. The communication device 10, which is requested to be connected to the management device 30, performs communication connection according to a request from the management device 30.

The management device 30 communicates with the communication device 10 via the management output part 42*b* and the management receiving part 12*a* and switches the communication device 10 to the mapping mode. When switching to the mapping mode via the management receiving part 12*a*, the output part 12*b* of the communication device 10 temporarily reduces the output.

After disconnection of the communication with the communication device 10, the signal receiving part 42*a* of the management device 30 receives the identification information outputted by the output part 12*b* of the communication device 10 that has switched to the mapping mode. The first acquiring part 43 of the management machine 30 acquires the identification information received by the signal receiving part 42a.

The management machine 30 checks whether the radio wave reception strength of the identification information acquired by the first acquisition part 43 is equal to or larger than a predetermined threshold value based on the threshold value stored in advance in the management storage part 46.

Figure 9:
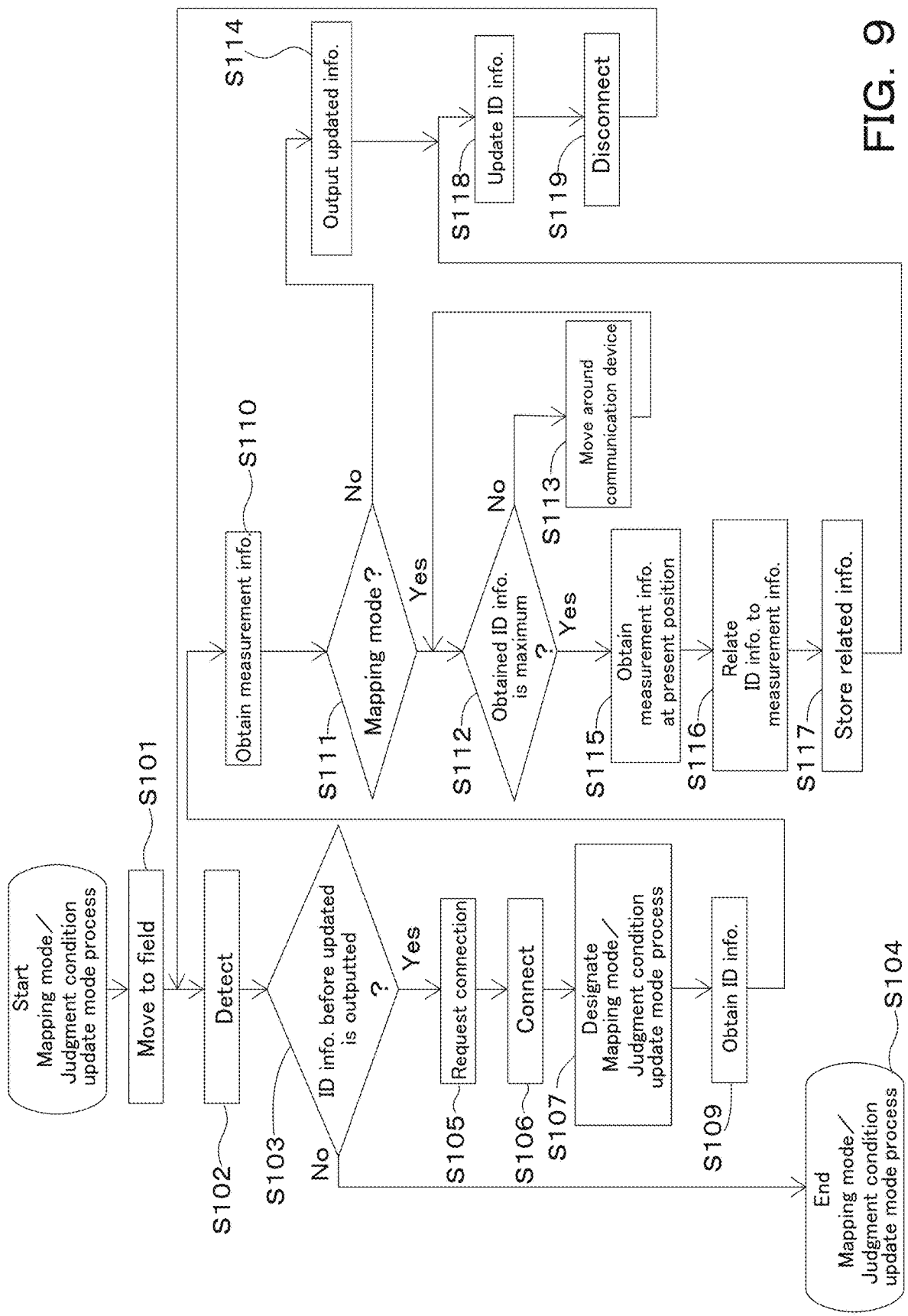
FIG. 9 is a view .illustrating a flow of the mapping mode/a judgment condition updating mode of the management machine according to the first embodiment.

In the determination of a point where the radio wave reception intensity (radio wave intensity) is equal to or greater than the predetermined threshold value, the field 3 is divided into lattice (mesh) shapes, and radio field intensity of each communication device 10 is compared for each mesh 3a. Specifically, as shown in FIG. 9, the management machine 30 acquires the field information acquired from the storage part 52 of the server 50 via the server output part 51b and the signal receiving part 42a, or the field information stored in the management storage part 46 Based on the field information, move in the field 3.

Compares the reception strength of the identification information of each communication device 10 received by the signal reception part 42a, and estimates the position of the communication device 10. For example, the numerical value in each mesh 3a shown in FIG. 3D indicates the radio field intensity of the communication device 10 arranged at the point B-3 in each mesh 3a. In this case, it is estimated that the communication device 10 is installed at the point B-3 where the radio wave intensity received by the management device 30 shows the local maximum value.

Figure 3A:
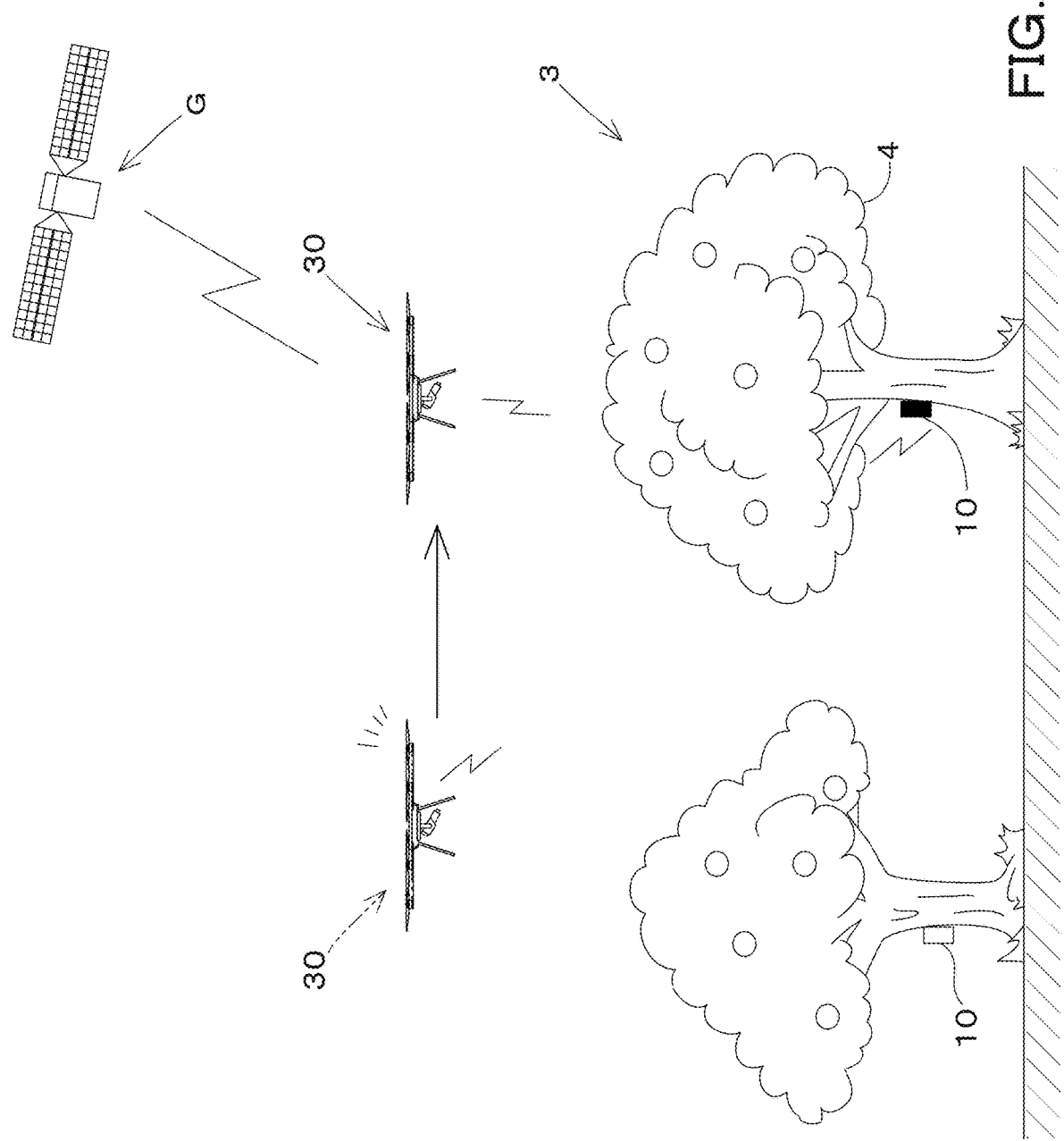
FIG. 3A is a second view illustrating the movement of the management machine in the mapping mode according to the first embodiment.

As shown in FIG. 3A, when the manager 30 is in the mapping mode, the position detecting part 41 detects a position at a point where the radio field strength acquired by the first acquiring part 43 is equal to or larger than a predetermined threshold value. The second obtaining part 44 obtains the positioning information detected by the position detecting part 41.

The associating part 45 associates positioning information at a point where the radio wave intensity acquired by the first acquiring part 43 is equal to or larger than a predetermined threshold with the updated identification information. The association information (positioning information, identification information) is stored in the management storage part 46.

Or it is temporarily stored in the management storage part 46 and transmitted to the server 50 via the management output part 42b and the fourth acquisition part 51a. The registration part 53 of the server 50 registers the association information and the field information such as the field name and the field position in the storage part 52 in association with each other.

The management machine 30 requests the communication device 10 for which registration of the field information has been completed via the management output part 42b and the receiving part 12a to update the identification information. The communication apparatus 10 updates the identification information in response to a request from the management machine 30.

After disconnecting communication with the communication device 10, the management device 30 starts detecting the output of the other communication device 10. Based on the updated identification information stored in the management storage part 46 or the storage part 52, the management machine 30 determines whether or not the position information has been registered.

Figure 3B:
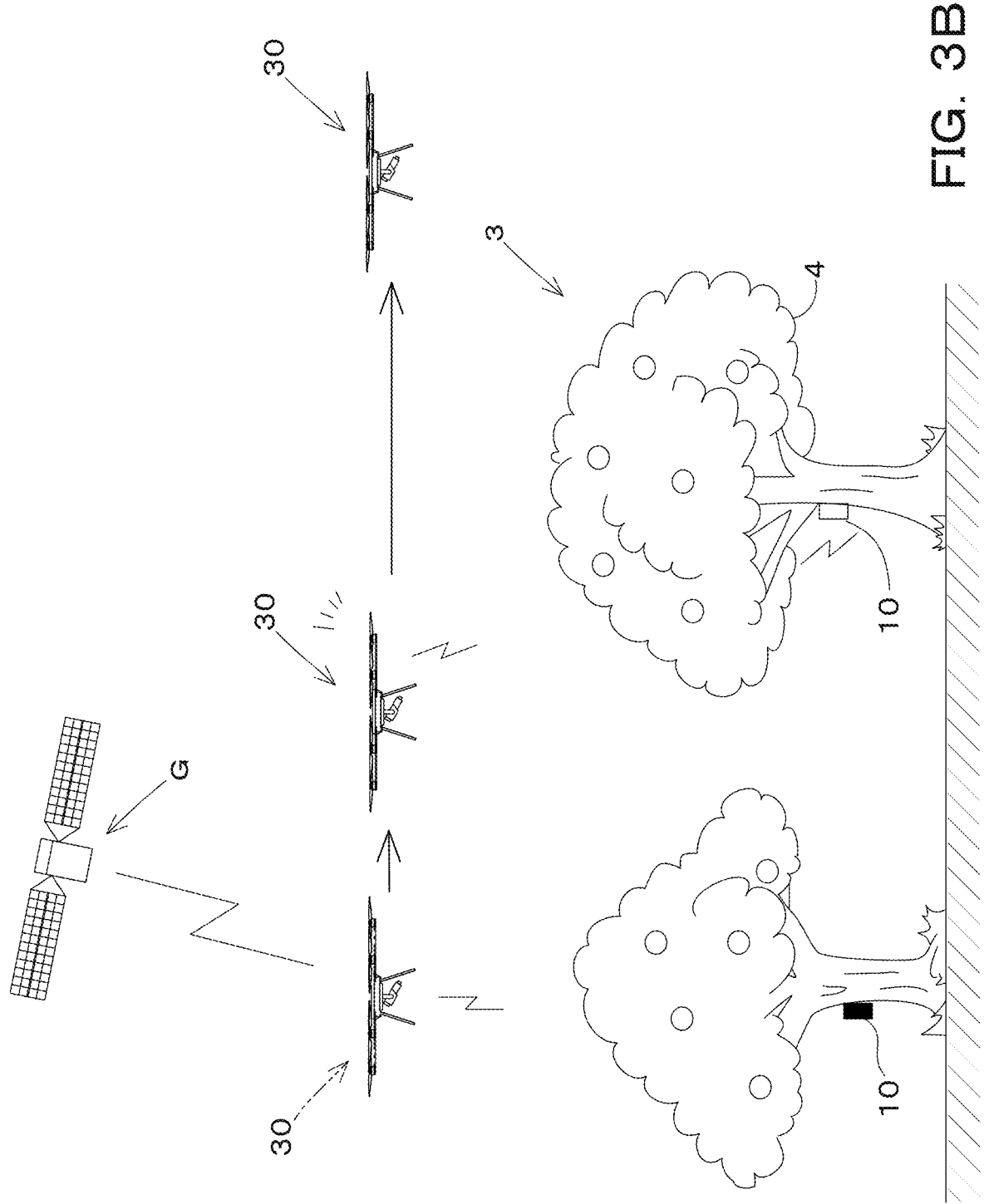
FIG. 3B is a third view illustrating the movement of the management machine in the mapping mode according to the first embodiment.
Figure 3D:
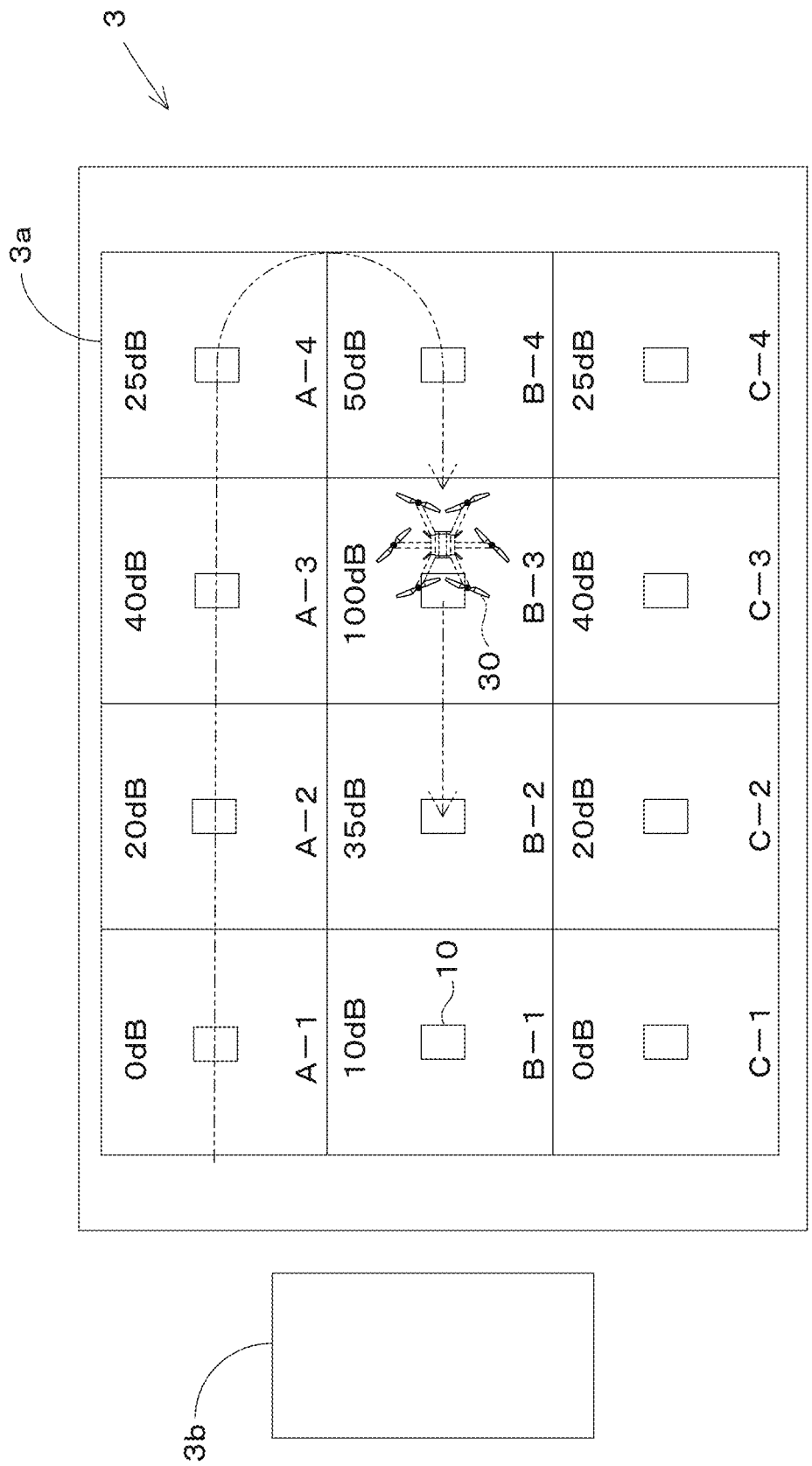
FIG. 3D is a fifth view illustrating the movement of the management machine in the mapping mode according to the first embodiment.

That is, as shown in FIG. 3B, in the mapping mode, the manager 30 does not request connection to the communication device 10 that outputs the updated identification information. In other words, the management device 30 requests connection only to the communication device 10 that outputs the identification information before updating. When there is no communication device 10 that outputs the identification information before updating, the management device 30 terminates the mapping mode.

In the present embodiment, the output part 12b outputs the identification information and the notification information as radio waves, but may output such as light. For example, the output part 12b outputs the light emission pattern indicating the identification information of the plurality of communication devices 10.

As shown in FIG. 3C, the position detection part 41 detects positioning information at a point where the reciprocal of the horizontal distance between the light acquired by the first acquisition part 43 and the first acquisition part 43 is equal to or larger than a predetermined threshold value.

The associating part 45 associates the positioning information at the point where the reciprocal of the horizontal distance between the light acquired by the first acquiring part 43 and the first acquiring part 43 is equal to or larger than a predetermined threshold and the updated identification information. The association information is stored in the management storage part 46.

Or it is temporarily stored in the management storage part 46 and transmitted to the server 50 via the management output part 42b and the fourth acquisition part 51a. The registration part 53 of the server 50 registers association information and field information in the storage part 52 in association with each other.

Next, the monitoring mode will be described. The monitoring mode detects a dynamic abnormality such as invasion of a person invading the field 3 or an intruding animal. The mode is a mode in which the management machine 30 is dispatched to the detection part of the abnormality based on the position information. The switching instruction to the monitoring mode is performed from the portable terminal 60 or the like connected to the server 50.

Figure 16C:
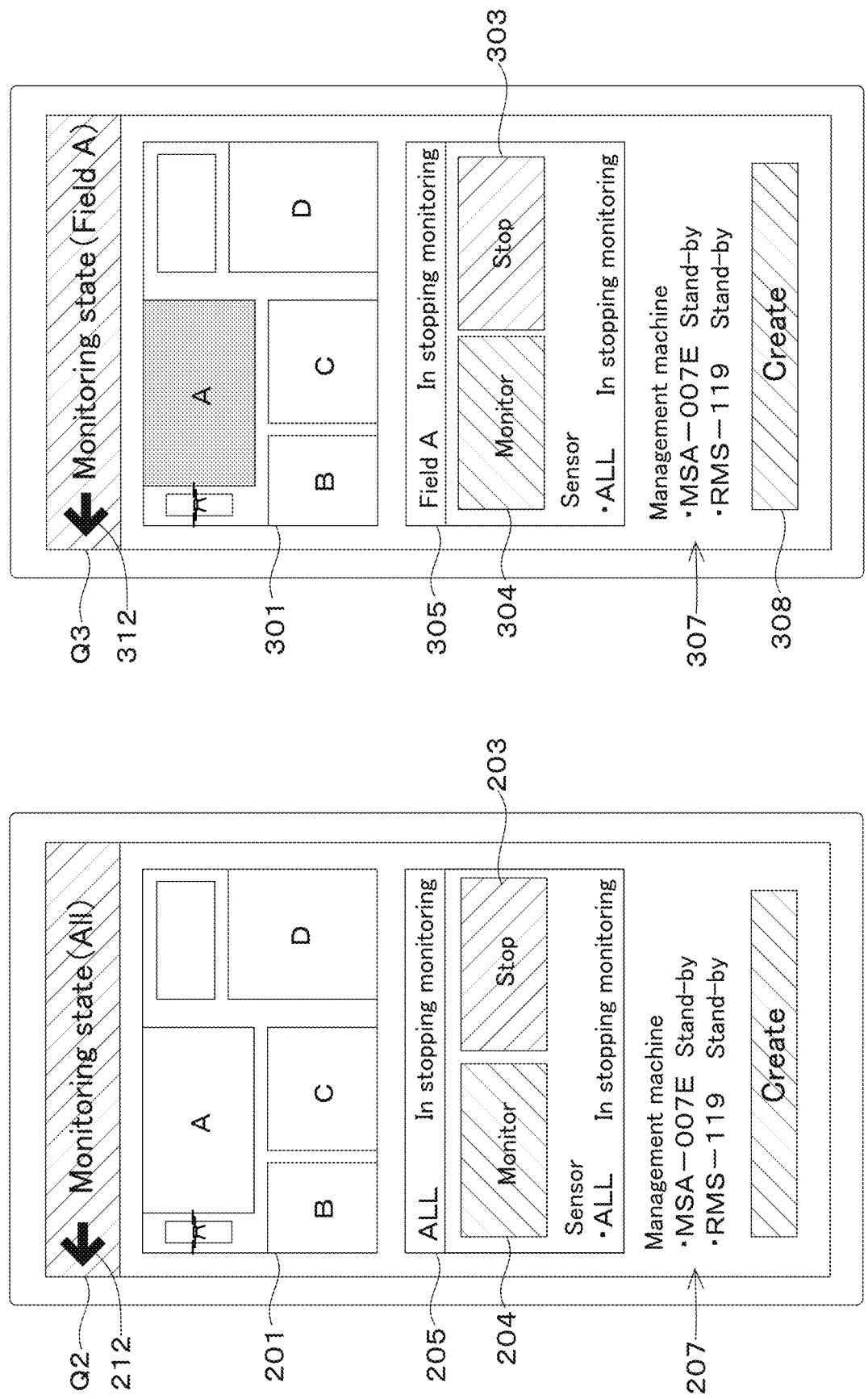
FIG. 16C is a view illustrating a monitoring state screen for all of the case where the monitoring is stopped and a view illustrating the monitoring state screen for all of the case where the monitoring is stopped according to the second embodiment.

More specifically, for example, as shown in FIG. 14, the monitoring button 103 on the home screen Q1 of the mobile terminal 60 or the like is selected. When the monitoring button 103 is selected, as shown in FIG. 16C, a monitoring status screen Q2 is displayed.

When the monitoring button 204 on the monitoring situation screen Q2 is selected, the portable terminal 60 instructs the server 50 to switch to the monitoring mode. (Monitoring instruction) to the monitoring mode from the monitoring instructing part 51b3 of the server 50 via the signal receiving part 42a and the server output part 51b.

Figure 2A:
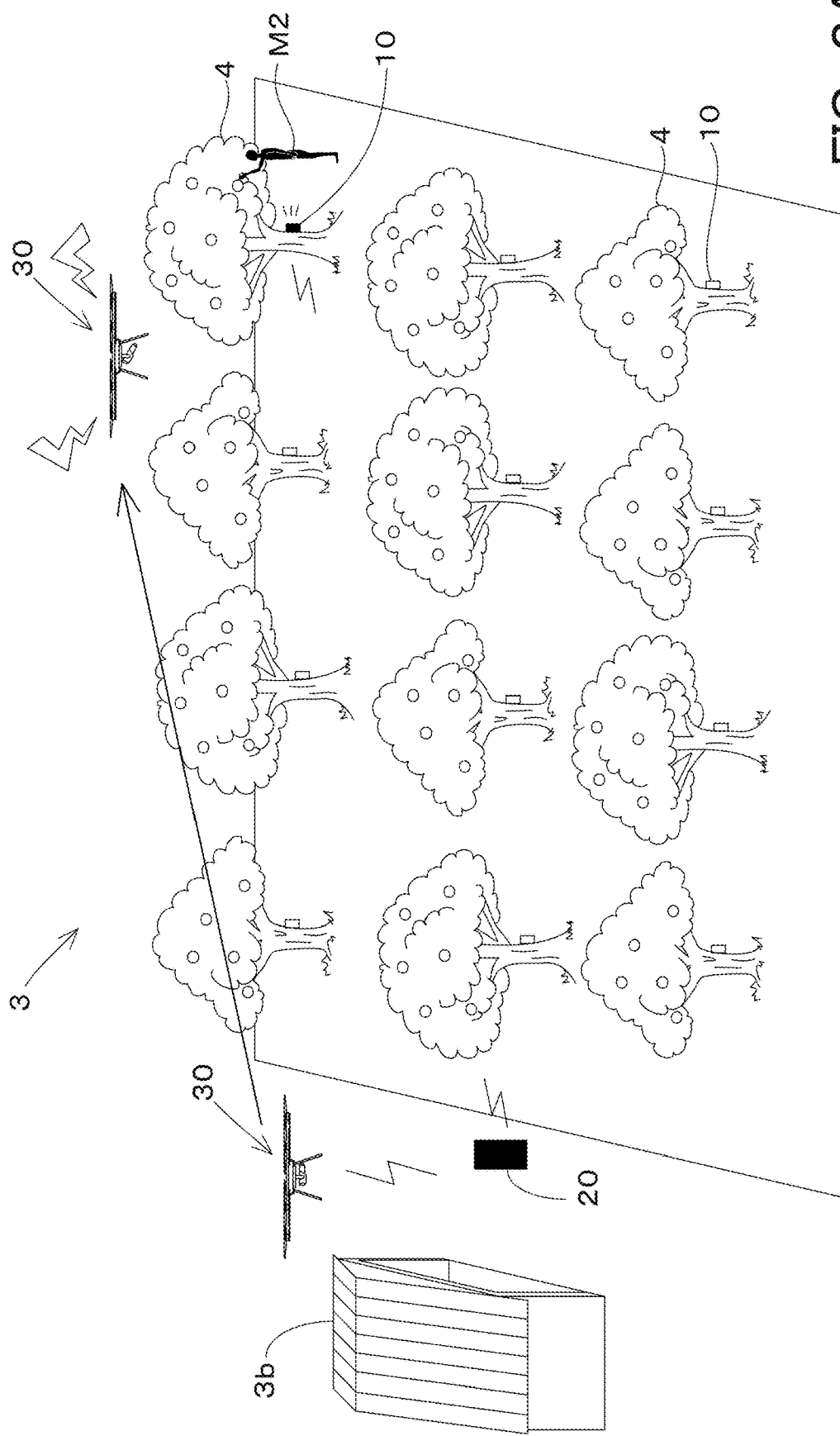
FIG. 2A is a view illustrating movement of a management machine in a monitoring mode according to the first embodiment.
Figure 2B:
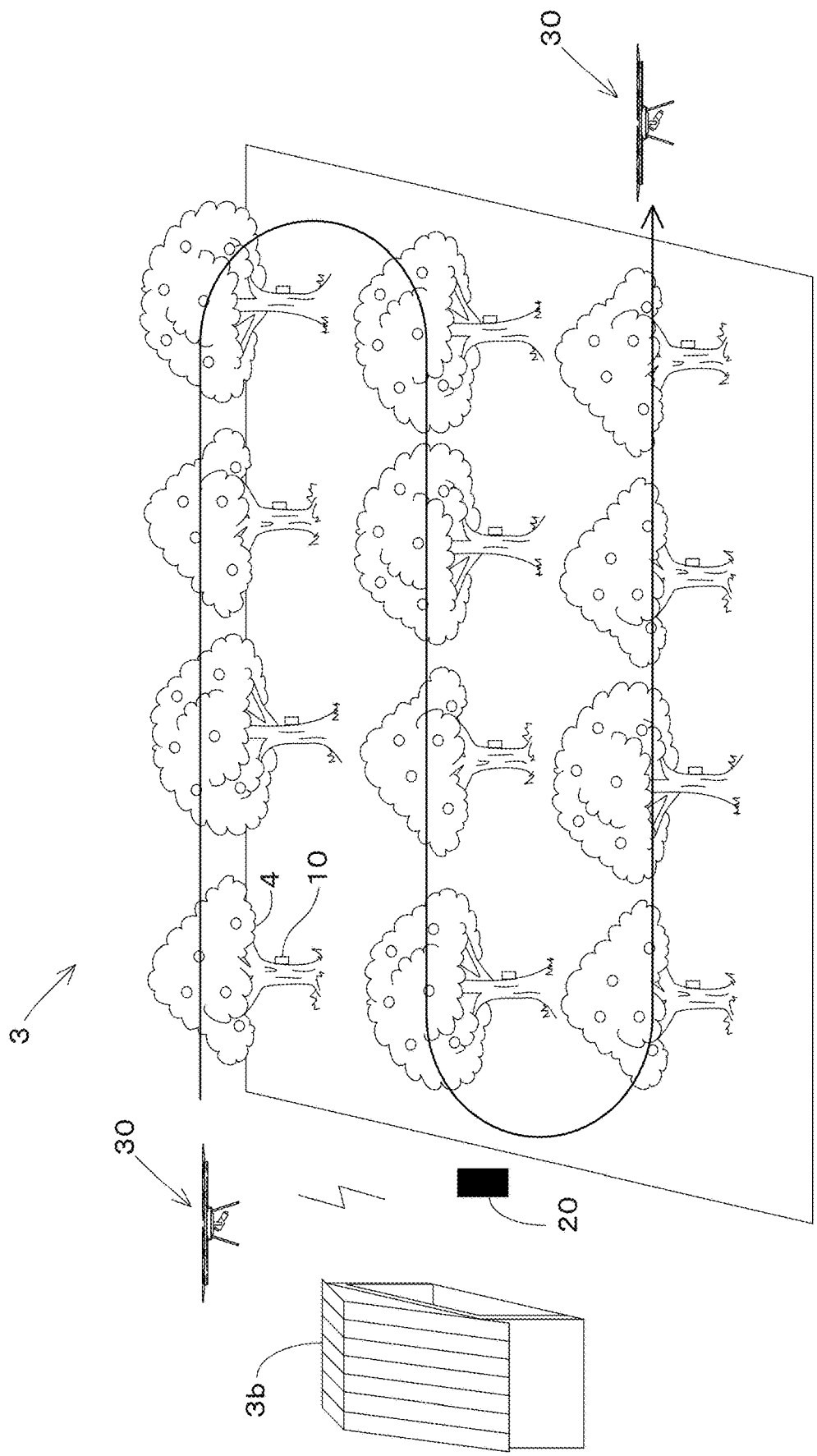
FIG. 2B is a first view illustrating the movement of the management machine in a mapping mode according to the first embodiment.

Upon receiving the monitoring instruction, the management machine 30 stands by at a predetermined standby location 3 b such as the vicinity of the field 3 shown in FIG. 2A. When the switching instruction to the monitoring mode is completed, as shown in FIG. 20, the screen display of the display part 62 transitions to the home screen Q1.

The communication device 10 initializes the output of the output part 12b and initializes the determination condition. The physical quantity detection part 11 starts detecting the physical quantity. The notification creation part 12c determines whether or not the physical quantity detected by the physical quantity detection part 11 matches any one of the notification determination conditions.

When the first condition (semi-dangerous) of the notification determination condition is met, the notification creation part 12c creates first notification information indicating that it is semi-dangerous. The output part 12b of the communication device 10 outputs the first notification information created by the notification creating part 12*c*.

When the second condition (danger) of the notification determination condition is met, the notification creation part 12*c* creates second notification information indicating danger.

When it matches the second condition (danger) of the notification determination condition and does not match the third condition (urgent), the output of the output part 12*b* is initialized.

The output part 12*b* of the communication device 10 outputs the second notification information created by the notification creation part 12*c*.

When the third condition (urgent) of the notification determination condition is met, the notification creation part 12*c* creates third notification information indicating that it is urgent.

The communication device 10 checks whether there is a connection request from the dispatching part 20. When there is no connection request from the dispatching part 20, the output part 12*b* of the communication device 10 sets the output of the third notification information created by the notification creating part 12*c*, and does not output the third notification information. A state in which the output part 12*b* sets the output of the third notification information and does not output the third notification information is also referred to as a "stealth mode".

When the fourth condition (ERROR) of the notification determination condition is met, the notification creation part 12*c* creates fourth notification information indicating that ERROR has occurred. The output part 12*b* of the communication device 10 outputs the fourth notification information created by the notification creation part 12*c*.

When any of the notification determination conditions is not satisfied, the output part 12*b* of the communication device 10 sets the identification information. The output part 12*b* outputs the identification information.

The output part 12*b* of the communication device 10 outputs the first notification information, the second notification information, and the fourth notification information generated by the notification creating part 12*c* with different radio wave outputs. More specifically, the first notification information and the fourth notification information are output with smaller radio wave output than the second notification information.

The second communication part 21 of the dispatching part 20 detects notification information of the communication device 10. The call determination part 21*c* determines whether notification information is output.

When the call determination part 21*c* determines that the notification information is not output from any of the plurality of communication devices 10, the signal reception part 42*a* receives the activation information from the server 50 or the mobile terminal 60 And confirms whether or not it is done.

When the signal receiving part 42*a* receives activation information from the server 50 or the mobile terminal 60, the dispatching part 20 starts detection of the communication device 10 not outputting the notification information. The dispatching part 20 makes a connection request to the detected communication device 10.

The communication device 10 that meets the third condition makes a connection according to the connection request. The second communication part 21 of the dispatching part 20 requests the communication device 10 to increase the output of the output part 12*b*.

If there is a request to increase the output of the output part 12*b*, the communication device 10 increases the output of the output part 12*b* and outputs the third notification information from the output part 12*b*. The second communication part 21 disconnects the communication after requesting an increase in the output. After checking the request to increase the output of the output part 12*b*, the communication device disconnects the communication.

If the communication device 10 determines that there is no request to increase the output from the second communication part 21, the communication device 10 disconnects the communication.

When notification information is not output from any of the plurality of communication devices 10 and no activation information is also acquired, the call determination part 21*c* determines not to call the management device 30.

When the call determination part 21*c* determines that notification information is output from any of the plurality of communication devices 10 from the output part 12*b*, the third acquisition part 21*a* of the dispatching part 20 acquires the notification information.

When the third acquisition part 21*a* determines that the third notification information has been acquired, the call determination part 21*c* determines, on the basis of the third notification information acquired by the third acquisition part 21*a*, the calling number 3 Create call information.

If the notification information acquired by the third acquisition part 21*a* is not the third notification information, the call determination part 21*c* confirms whether the notification information acquired by the third acquisition part 21*a* is the first notification information.

If the notification information acquired by the third acquisition part 21*a* is the first notification information, it is detected whether there is notification information of another communication device 10. The call determination part 21*c* checks whether or not the other communication device 10 is outputting the second notification information.

If it is determined that the second notification information is not output, the call determination part 21*c* creates the first call information based on the first notification information. In other words, when the notification information acquired by the third acquisition part 21*a* is only the first notification information, the call determination part 21*c* creates first call information to be called due to occurrence of semi-danger on the basis of the first notification information.

On the other hand, when the third acquisition part 21*a* detects the first notification information and detects the second notification information outputted by the other communication device 10, the call determination part 21*c* determines, on the basis of the second notification information having a high degree of danger Create second call information to call due to occurrence of danger.

Further, when the notification information acquired by the third acquisition part 21*a* is not the first notification information and the third notification information, the call determination part 21*c* confirms whether the notification information is the second notification information. When the notification information is the second notification information, the call determination part 21*c* creates the second call information based on the second notification information.

When the notification information acquired by the third acquisition part 21*a* does not correspond to any of the first notification information, the second notification information, and the third notification information, and in the case where the fourth notification information is acquired, the fourth notification information The management output part 42*b* transmits the notification information to the server 50.

Hereinafter, the management machine 30 responding to the call of the dispatching part 20 will be described.

In a case where neither the mapping mode nor the determination condition update mode is applicable, the management machine 30 detects whether the first call information, the second call information, and the third call information are output. The management machine 30 that acquired the call information via the signal receiving part 42a transmits the call information to the server 50. The management machine 30 requests the server 50 to transmit the positioning information of the communication device 10 that output the notification information.

When the fourth acquisition part 51a acquires the call information, the server 50 responds to the connection request of the management machine 30. Based on the call information acquired by the fourth acquisition part 51a, the association information stored in the storage part 52, and the field information, the server 50 identifies the positioning information of the communication device 10 that output the notification information. The server output part 51b outputs the positioning information to the management machine 30.

The signal receiving part 42a receives the positioning information, and the management machine 30 moves to the installation location of the communication device 10 that output the notification information based on the positioning information. In this manner, the management machine 30 is called up at the installation location of at least one communication device 10 among the plurality of communication devices 10 that output the notification information.

After moving to the installation location of the communication device 10, the management device 30 performs predetermined actions based on the call information. For example, the management machine 30 performs a warning action by the warning part 48 and/or a monitoring action by the monitoring part 47.

More specifically, as shown in FIG. 2A, the warning part 48 issues a warning sound to warn the intruder M2. When the monitoring part 47 is a video camera that captures moving images, it captures moving images around the communication device 10 as a movement destination. The captured moving image data is associated with the identification information and stored in the management storage part 46.

After moving to the predetermined standby location 3 b, the management machine 30 transmits the information associating the moving image data and the identification information to the server 50 via the management output part 42b and the fourth acquisition part 51a. And the fourth acquisition part 51a acquires the information.

The registration part 53 associates the information acquired by the fourth acquisition part 51a with the field information and registers the information in the storage part 52. Incidentally, the information may be transmitted to the server 50 simultaneously with the moving image shooting, or may be transmitted to the server 50 after the moving image shooting is ended.

On the other hand, if the management machine 30 determines that the first call information, the second call information, and the third call information are not output, it confirms whether or not the fourth notification information is output. When receiving the fourth notification information, the management machine 30 transmits the fourth notification information to the server 50.

If there is no field registration instruction and neither the first call information, the second call information, or the third call information is received, the server 50 checks whether the fourth notification information is output from the management machine 30. When the server 50 acquires the fourth notification information, the registration part 53 associates the fourth notification information with the field information and stores it in the storage part 52.

If there is no field registration instruction and neither the first call information, the second call information, or the third call information is received, the server 50 checks whether the fourth notification information is output from the management machine 30. When the server 50 acquires the fourth notification information, the registration part 53 associates the fourth notification information with the field information and stores it in the storage part 52.

Specifically, the portable terminal 60 is operated to transmit an update instruction (update information) of the notification determination condition from the update instruction part 51b1 of the server 50 to the dispatching part 20 or the management machine 30. Upon receiving the update information from the server 50, the dispatching part 20 or the management machine 30 transmits the update information to the communication device 10.

The communication apparatus 10 updates the notification determination condition based on the received update information. In the present embodiment, the values of the predetermined thresholds F1, F2, and F3 of the notification determination condition are changed.

Figure 15:
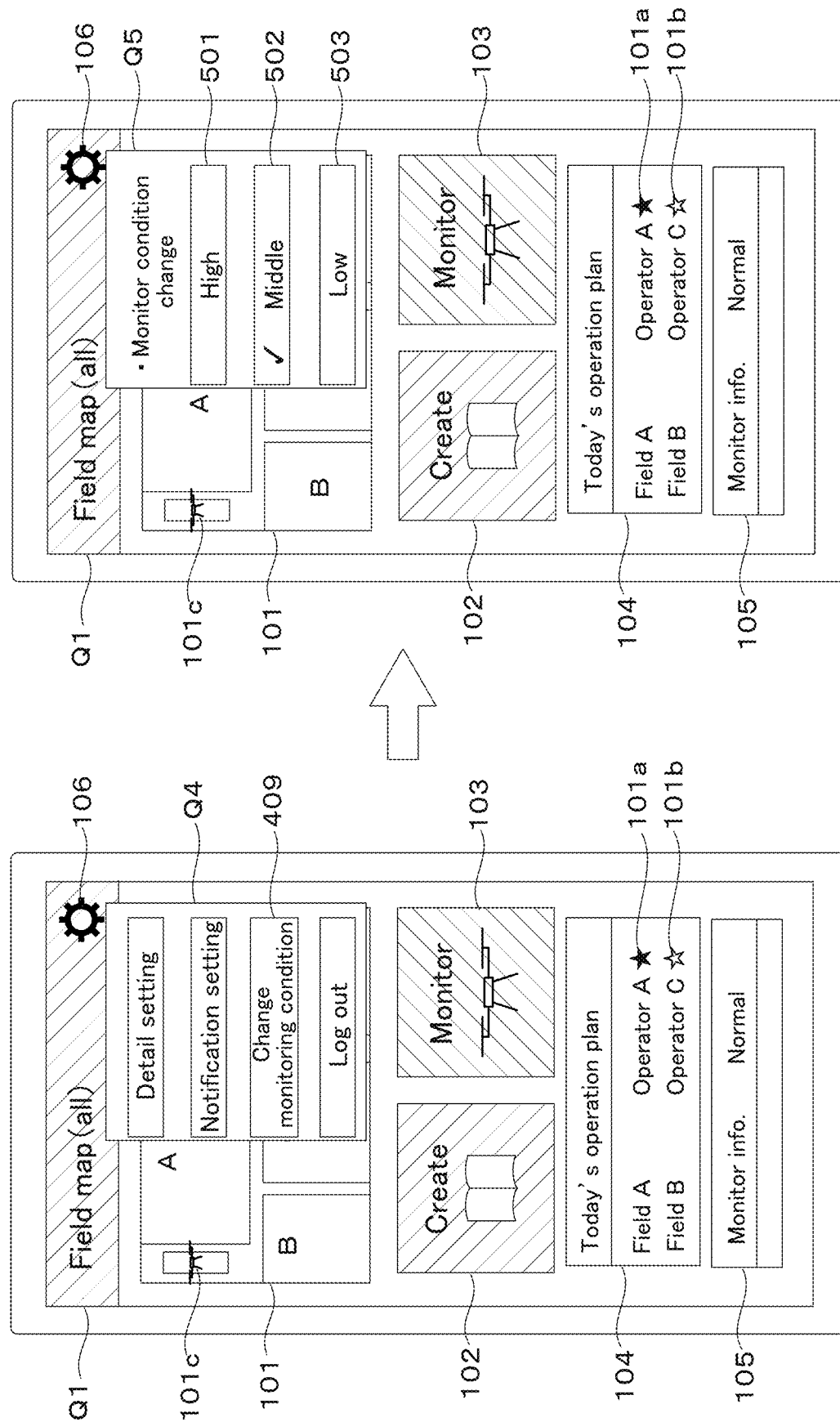
FIG. 15 is a view illustrating a setting screen of the home screen and a view illustrating that the monitor condition change is selected in the setting screen according to the second embodiment.

When the setting button 106 of the home screen Q1 is selected, as shown in FIG. 20, the screen display of the display part 62 transitions to display a setting screen Q 4 as shown in FIG. 15. When the condition change button 409 on the setting screen Q 4 is selected, the monitor change screen Q 5 is displayed.

In the present embodiment, "high" 501, "medium" 502, and "low" 503 on the monitor change screen Q 5 indicate the accuracy of the notification determination condition. If "high" 501 of the monitoring change screen Q 5 is selected, the values of the predetermined thresholds F1, F2, F3 are set smaller than the predetermined thresholds F1, F2, F3 of "medium" 502.

Further, when "low" 503 of the monitor change screen Q 5 is selected, the values of the predetermined thresholds F1, F2, F3 are set to be larger than the predetermined thresholds F1, F2, F3 of "medium" 502. That is, when "high" 501 is selected, the monitoring accuracy is set high, and if "low" 503 is selected, the monitoring precision is set low.

If "medium" 502 is selected, the monitoring accuracy is set between "high" 501 and "low" 503.

When one of "high" 501, "medium" 502, and "low" 503 on the monitoring change screen Q 5 is selected, the selected update information is transmitted from the portable terminal 60 to the server 50.

In the present embodiment, the update of the notification determination condition is to be changed to a preset predetermined threshold value, but even if the threshold value can be freely changed, such as by directly inputting the threshold value Good.

When the transmission of the update information is completed, on the display part 62 of the mobile terminal 60, the screen display of the display part 62 transitions to the home screen Q1 as shown in FIG. 20.

When the server 50 receives the update information from the portable terminal 60, the update information is transmitted from the update instruction part 51b1 of the server 50 to the management machine 30 and/or the dispatching part 20. That is, the notification determination condition of the communication device 10 can be updated via either the management machine 30 or the dispatching part 20.

Hereinafter, a case of updating the notification determination condition via the management machine 30 will be described.

The management device 30 updates the notification determination condition of the communication device 10 in the same procedure as the mapping mode. For example, the management machine 30 that has received the update information from the update instruction part of the server 50 moves to the field 3 where the communication device 10 is installed.

The management machine 30 that has moved to the field 3 detects the identification information output from the communication device 10. The management machine 30 requests connection to the communication device 10 matching with the identification information recorded in the management storage part 46 or the storage part 52. The communication device 10 which is requested to connect makes a connection with the management device 30.

The management device 30 designates the determination condition update mode to the communication device 10. The management device 30 and the communication device 10 disconnect communication. Based on the threshold value stored in advance in the management storage part 46, the position detection part 41 acquires positioning information at a point where the strength of the identification information (radio wave) acquired by the first acquisition part 43 is equal to or greater than the threshold value.

The management machine 30 checks whether it is in the mapping mode. When it is not the mapping mode, that is, in the case of the judgment condition update mode, the management machine 30 outputs update information.

The communication device 10 checks whether it is in the determination condition update mode. In the case of the determination condition update mode, the communication device 10 receives the update information from the management machine 30, and the determination updating part 13 updates the notification determination condition.

The management device 30 requests the communication device 10, which has completed updating of the notification determination condition, to update the identification information via the management output part 42b and the reception part 12a. The communication apparatus 10 updates the identification information in response to a request from the management machine 30. The management device 30 and the communication device 10 disconnect communication.

The associating part 45 associates the positioning information of the communication device 10 whose update of the notification determination condition is completed with the updated identification information. The associated information is stored in the management storage part 46. Or is temporarily stored in the management storage part 46 and transmitted to the server 50 via the management output part 42b and the third acquisition part 21a.

The registration part associates the information with the field information and registers it in the storage part 52. The management machine 30 may be configured to transmit the update information to the dispatching part 20 to update the notification determination condition via the dispatch part 20.

Hereinafter, a case of updating the notification determination condition via the dispatch part 20 will be described.

When the dispatching part 20 has not received the notification information and the activation information of the communication device 10, the dispatching part 20 confirms whether update information has been received from the server 50 or the management device 30. When the update information is received, the third acquisition part 21a acquires the update information.

The dispatching part 20 requests connection to the communication device 10. The communication device 10 that has made a connection request connects to the dispatching part 20. The communication device 10 checks whether it is in the determination condition update mode. The communication device 10 receives the updated notification determination condition from the dispatching part 20, and the determination updating part 13 updates the notification determination condition. After updating the notification determination condition, the communication with the dispatching part 20 is disconnected.

Figure 4:
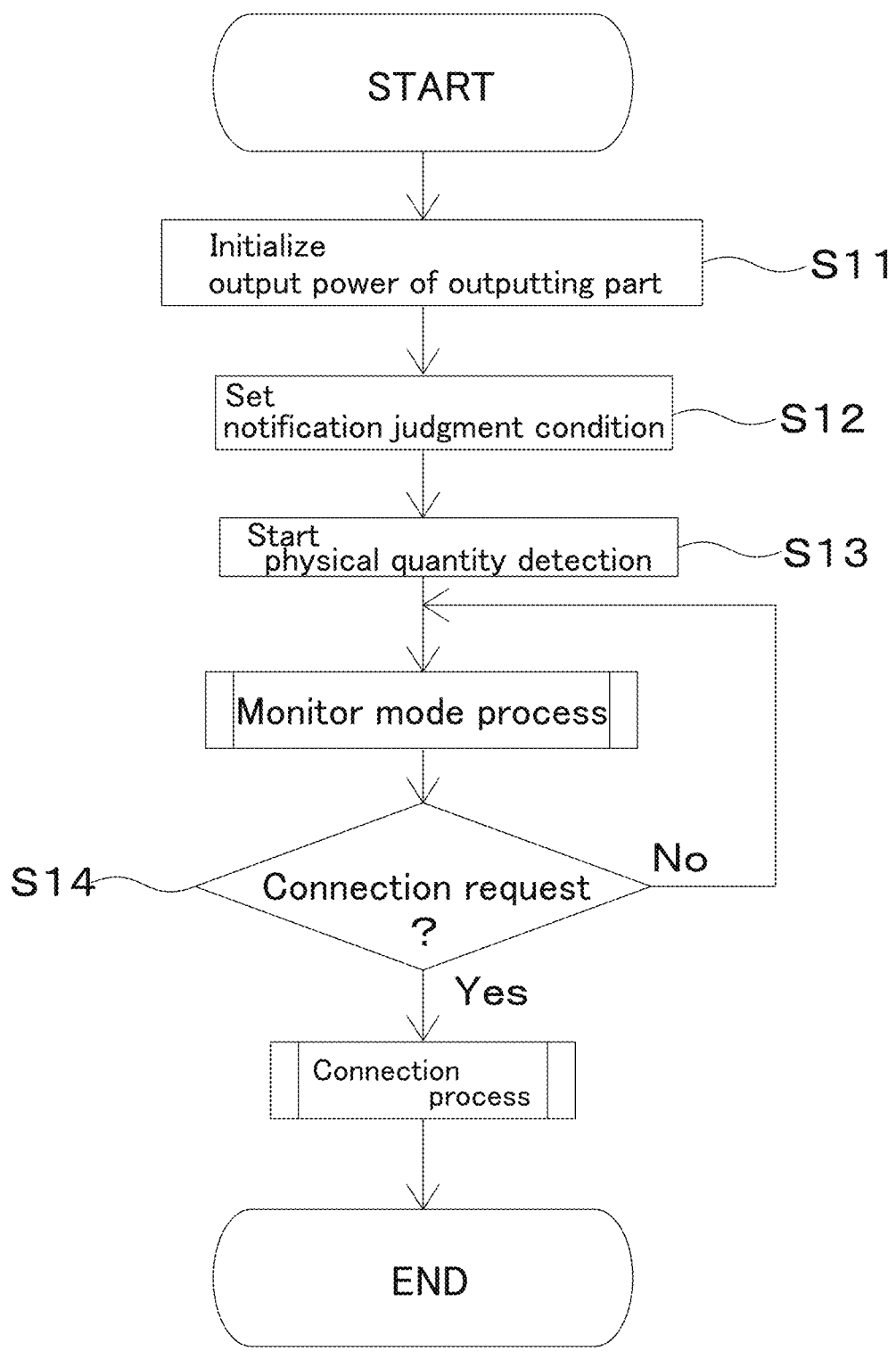
FIG. 4 is a view illustrating a sequential operation of a communication device according to the first embodiment.

Hereinafter, with reference to FIG. 4 a series of operations of the communication device 10 will be described.

After the activation, the communication device 10 initializes the transmission power of the outputting part 12b and outputs identification information (S 11).

After the activation of the communication device 10, the judgment updating part 13 initializes the notification judgment condition, and after the updating of the notification judgment condition, the judgment updating part 13 sets the updated notification judgment condition (S 12).

After the setting of the notification judgment condition by the judgment updating part 13, the physical quantity detecting part 11 starts to detect the physical quantity (S 13).

Figure 5A:
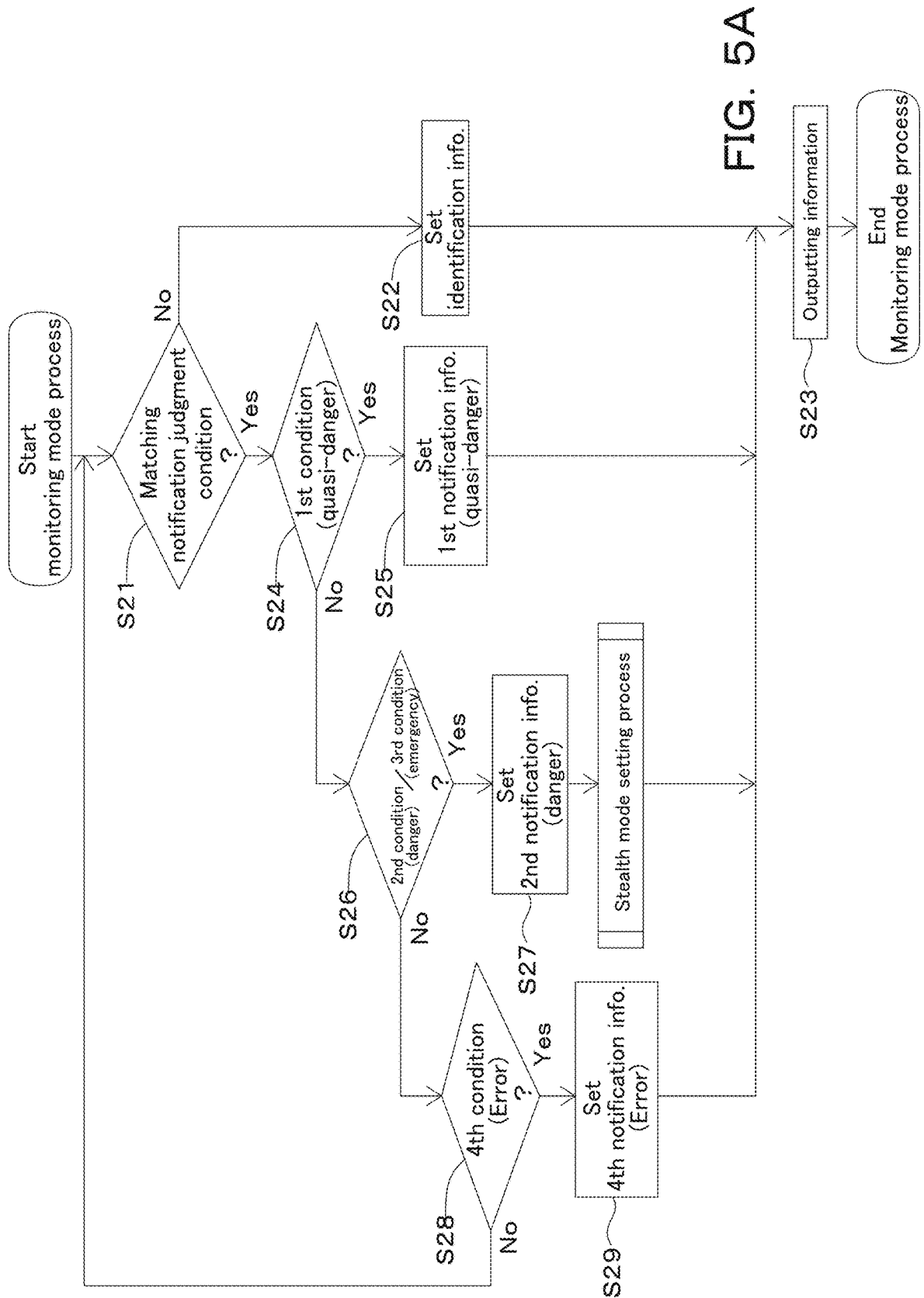
FIG. 5A is a view illustrating a flow of the monitoring mode of the communication device according to the first embodiment.

After the physical quantity detecting part 11 starts the detection, the process shifts to the process in the monitoring mode (the monitoring mode process) shown in FIG. 5A. It is judged whether a connection request is requested by the management machine 30 (S14), and repeats the monitoring mode process until the connection request is made.

Figure 5B:
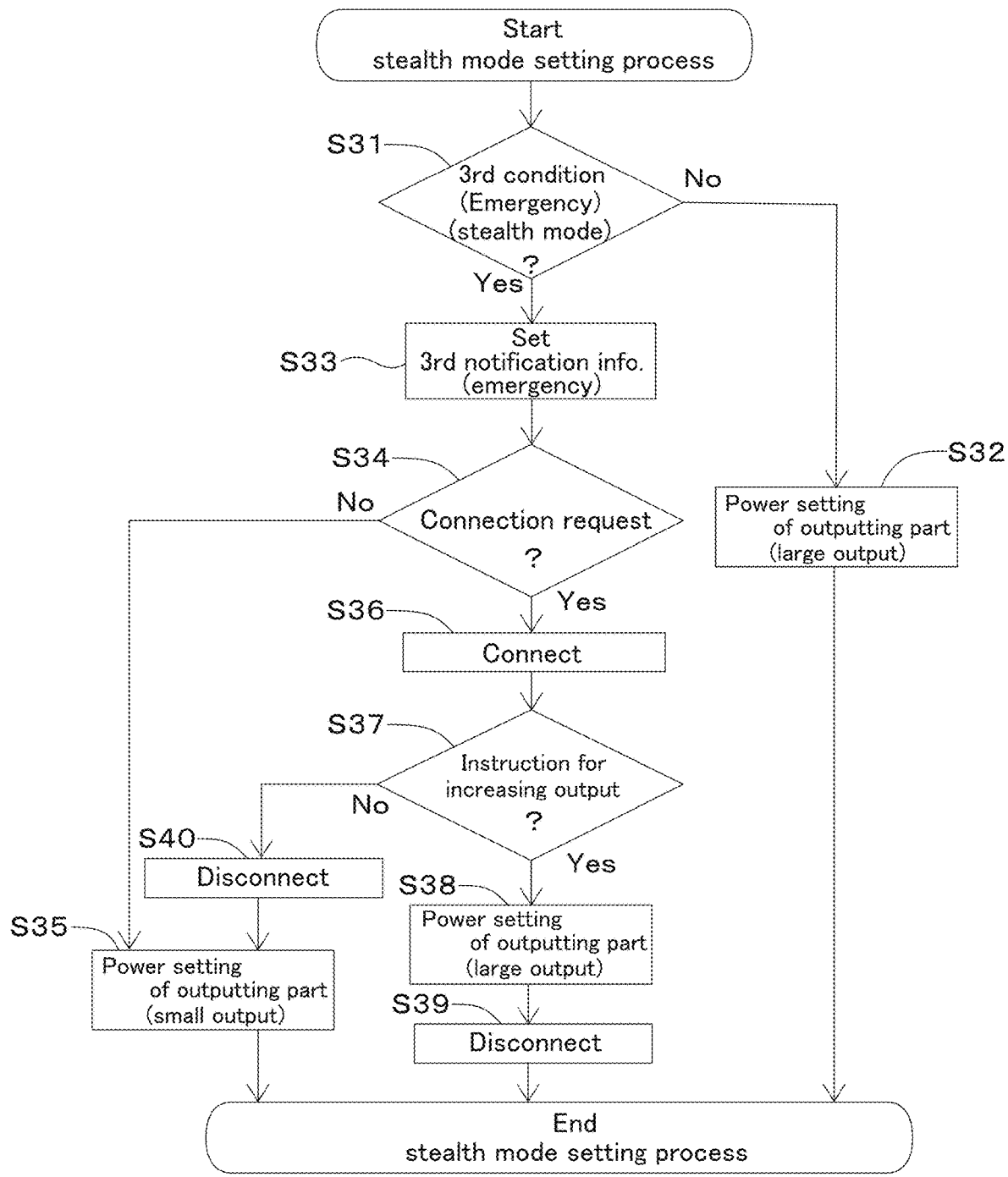
FIG. 5B is a view illustrating a flow of a stealth mode setting of the communication device according to the first embodiment.
Figure 5C:
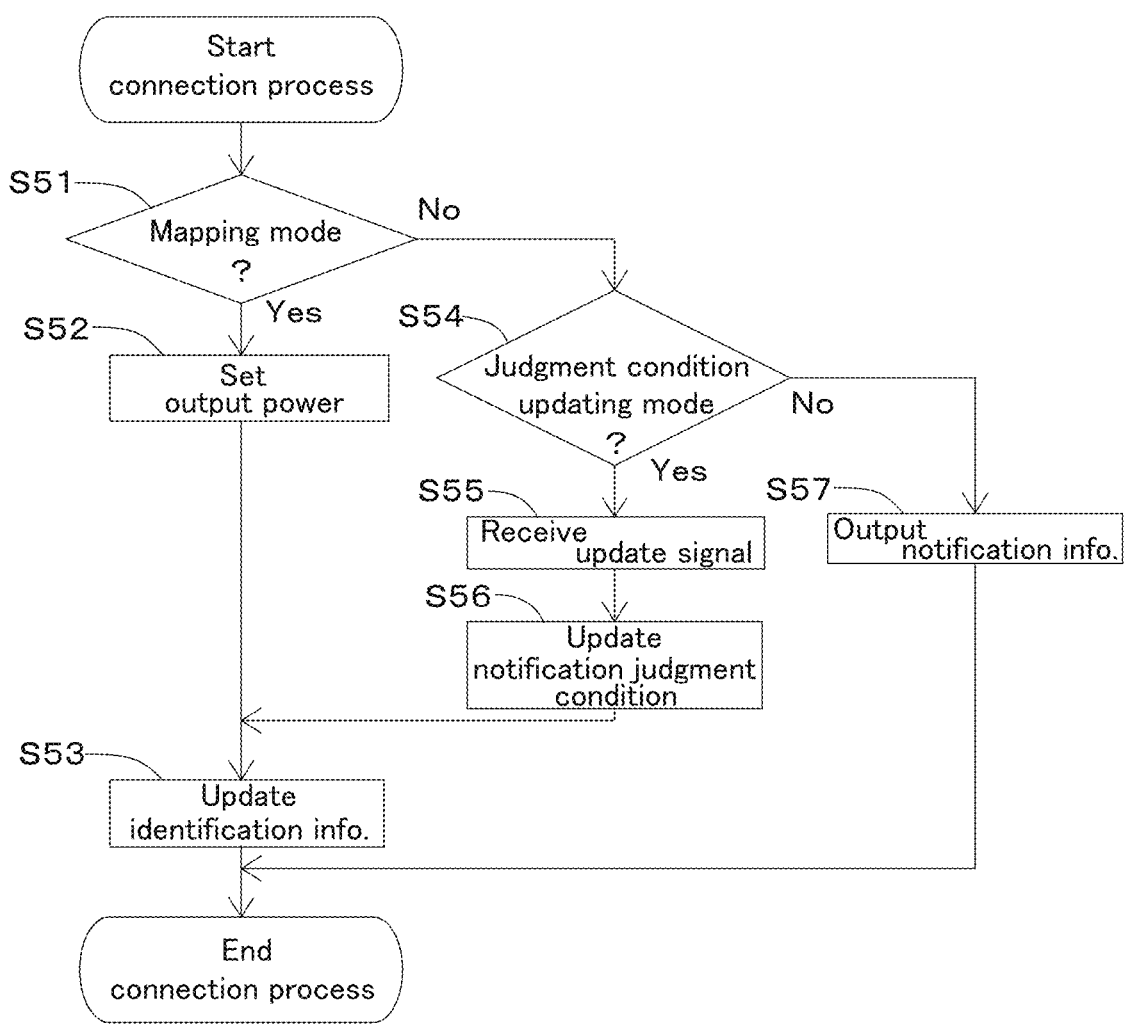
FIG. 5C is a view illustrating a flow of connection of the communication device according to the first embodiment.

If the connection request is issued, the process shifts to the connection process shown in FIG. 5C. After the connection process finishes, the communication device 10 is reactivated.

Next, with reference to FIG. 5A, the monitoring mode process of the communication device 10 will be described.

After the transition to the monitoring mode process, the notification creating part 12c of the communication device 10 judges whether the physical quantity detected by the physical quantity detecting part 11 is matched with any one of the notification judgment conditions (S 21).

In the case where the physical quantity is not matched with any of the notification judgment conditions (S21, No), the outputting part 12b of the communication device 10 sets the identification information (S22).

The outputting part 12b of the communication device 10 outputs the identification information (S 23).

In the case where the first condition of the notification judgment conditions is satisfied (S24, Yes), the notification creating part 12c sets (creates) the first notification information (S25).

The outputting part 12b of the communication device 10 outputs the first notification information created by the notification creating part 12c (S 23).

In the case where the second condition of the notification judgment conditions is satisfied (S26, Yes), the notification creating part 12c sets (creates) the second notification information (S27).

After the notification creating part 12c creates the second notification information, the communication device 10 shifts to the stealth mode setting process shown in FIG. 5B.

In the case where the fourth condition of the notification judgment conditions is satisfied (S28, Yes), the notification creating part 12c sets (creates) the fourth notification information (S29).

The outputting part 12b of the communication device 10 outputs the fourth notification information created by the notification creating part 12c (S 23).

Next, a process of setting the stealth mode by the communication device 10 will be described with reference to FIG. 5B.

The notification creating part 12c creates the second notification information (S 27), and after the process is shifted to the stealth mode setting, the notification creating part 12c judges whether or not the third condition of the notification judgment conditions is satisfied (S 31).

In the case where the second condition is satisfied and the third condition is not satisfied (S 31, No), the output of the outputting part 12b is initialized, and the output of communication is increased (S 32).

In the case where the third condition is satisfied (S 31, Yes), the notification creating part 12c sets (creates) the third notification information (S 33).

The communication device 10 checks whether a connection is requested by the dispatching part 20 (S 34).

In the case where no connection is requested by the dispatching part 20, the outputting part 12b of the communication device 10 lowers the output of the communication of the third notification information created by the notification creating part 12c (S 35).

When the connection is requested by the dispatching part 20, the connection is established in accordance with the connection request (S 36).

When the dispatching part 20 issues, to the receiving part 12a, a request for increasing the output of the outputting part 12b (S 37, Yes), the communication device 10 increases the output of the outputting part 12b and outputs the third notification information from the outputting part 12b (S 38).

After confirming the request for increasing the output of the outputting part 12b, the communication device disconnects the communication (S 39).

When the communication device 10 determines that there is no request for increasing the output from the dispatching part 20 (S37, No) (S37), the communication device 10 disconnects the communication (S40).

Next, the connection process of the communication device 10 will be described with reference to FIG. 5C.

In the case where the dispatching part 20 or the management machine 30 issues a connection request, the communication device 10 is shifted to the connection process and judges whether or not the mapping mode is set (S51).

In the case where it is determined that the mode is the mapping mode (S51, Yes), the outputting part 12b of the communication device 10 temporarily decreases the output (S52).

When the outputting part 12b of the communication device 10 temporarily decreases the output, the management machine 30 requests to update the identification information to the communication device 10, for which registration of the agricultural field information has been completed, through the management outputting part 42b and the receiving part 12a, and the communication device 10 updates the identification information in response to a request from the management machine 30 (S53).

In the case where it is determined that the mode is not the mapping mode (S53, No), the communication device 10 checks whether it is in the judgment condition update mode (S54).

In the case of the judgment condition update mode (Yes in S54), the receiving part 12a receives the update information from the management machine 30 (S55), and the judgment updating part 13 updates the notification judgment condition (S56).

When the judgment updating part 13 updates the notification judgment condition, the management device 30 requests the communication device 10 for which the update of the notification judgment condition has been completed to update the identification information, and the communication device 10 updates the identification information in response to a request of the management device 30 (S53).

In the case where it is determined that the mode is not the judgment condition update mode (No in S54), the communication device 10 disconnects the communication and terminates the connection process.

Next, with reference to FIG. 6, a series of operations of the dispatching part 20 will be described. When the dispatching part 20 is activated, the second communicating part 21 detects the notification information of the communication device 10 (S 61).

The calling judging part 21c judges whether the notification information is output (S62).

Figure 6:
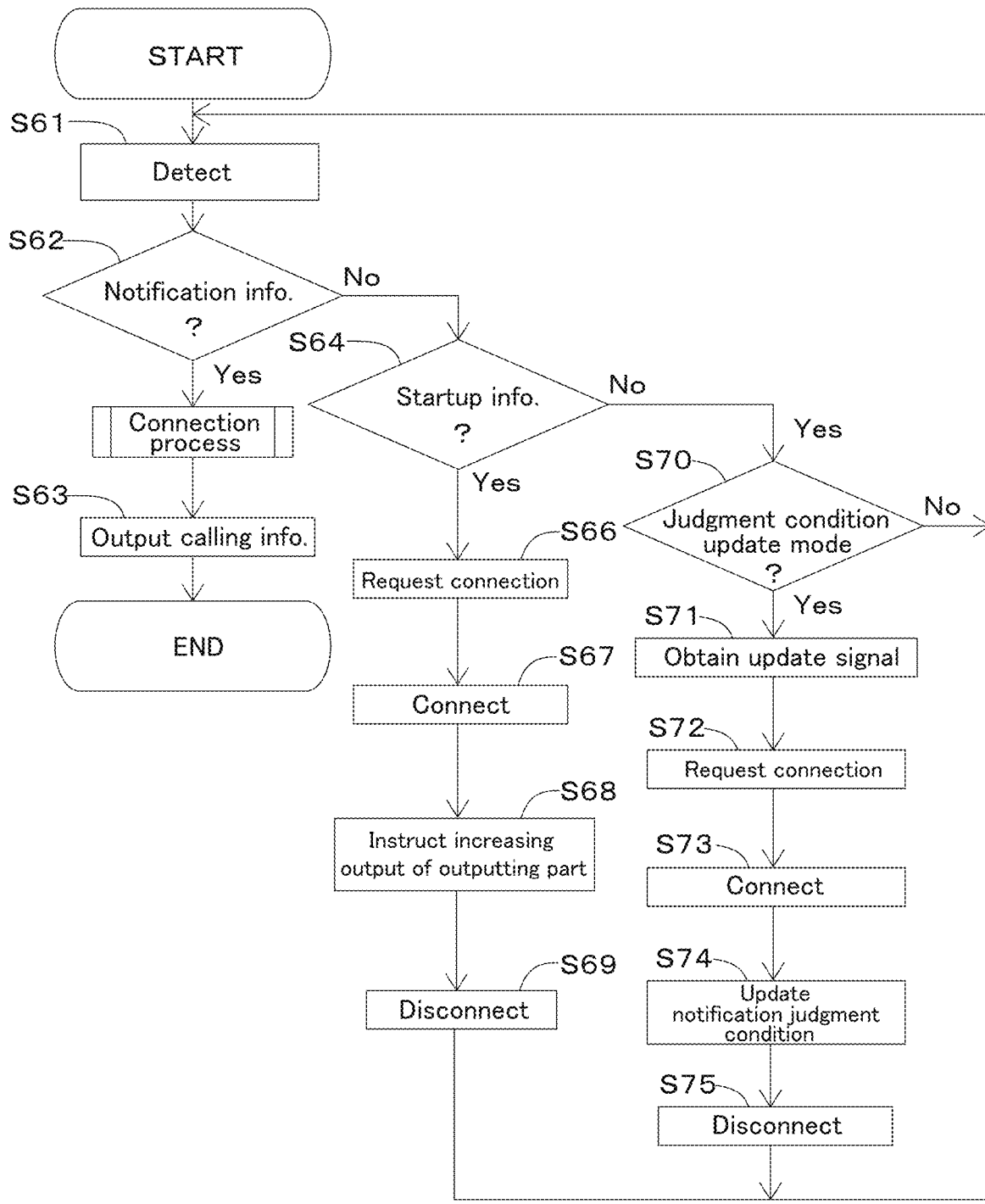
FIG. 6 is a view illustrating a sequential movement of a dispatching part according to the first embodiment.

As shown in FIG. 6, in the case where the calling judging part 21c determines that the notification information is outputted from any one of the outputting portions 12b of the plurality of communication devices 10 (S62, Yes), the dispatching part 20 is shifted to the connection process.

Upon termination of the connection process, the calling part 21b notifies the calling information created by the calling judging part 21c to the management machine 30 and/or the server 50 (S 63). In this manner, the management machine 30 is called.

In the case where the calling judging part 21c determines that the notification information is not outputted from any of the outputting portions 12b of the plurality of communication devices 10 (S62, No), the signal receiving part 42a confirms whether to receive the activation information from the server 50 or the mobile terminal 60 (S 64).

In the case where the signal receiving part 42a receives the activation information from the server 50 or the mobile terminal 60 (S 64, Yes), the dispatching part 20 requests the connection to the communication device 10 set in the stealth mode (S 66).

The communication device 10 to which the connection requested is issued makes a connection with the dispatching part 20 (S 67).

The second communicating part 21 of the dispatching part 20 requests the communication device 10 set to the stealth mode to increase the output of the outputting part 12b (requests to output the third notification information) (S 68).

The second communicating part 21 disconnects the communication after requesting the increase of the output (S 69).

After disconnecting the communication with the communication device 10, the dispatching part 20 detects again the notification information of the communication device 10 (S 61).

In the case where the dispatching part 20 has not received the notification information and the activation information of the communication device 10 (S 64, No), the dispatching part 20 confirms whether the update information has been received from the server 50 or the management device 30 (S 70).

In the case where the update information is received (S 70, Yes), the third obtaining part 21a acquires the update information (S 71).

The dispatching part 20 requests the connection to the communication device 10 (S 72).

The dispatching part 20 and the communication device 10 which is requested to make the connection are connected to each other (S 73).

After the connection, the dispatching part 20 transmits the updated notification judgment condition to the communication device 10 (S 74), and the judgment updating part 13 updates the notification judgment condition (S 56).

After the updating of the notification judgment condition, the communication with the dispatching part 20 is disconnected (S 75).

After the disconnection of communication with the communication device 10, the dispatching part 20 detects again the notification information of the communication device 10 (S 61).

Figure 7:
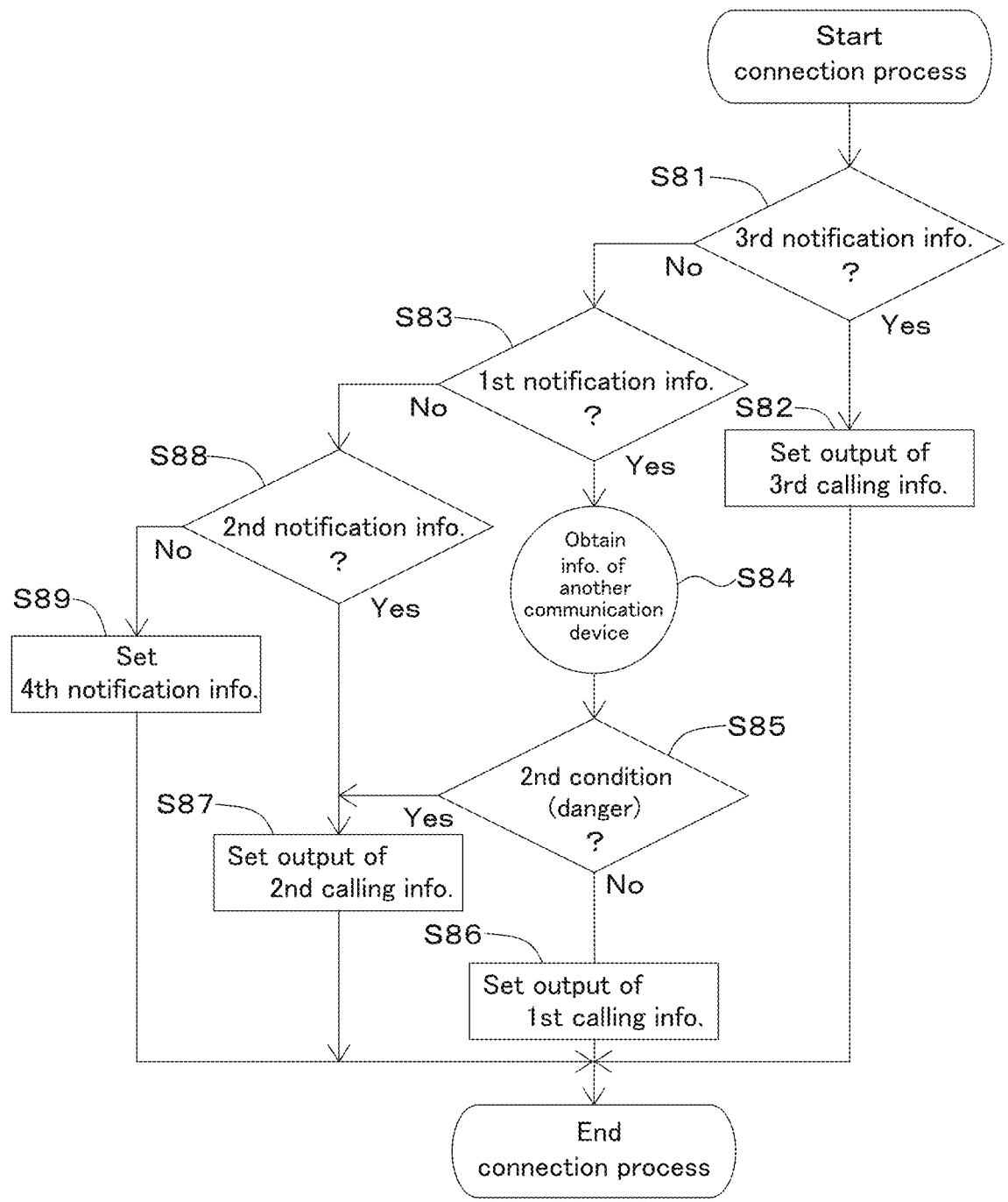
FIG. 7 is a view illustrating a flow of a connection process of the dispatching part according to the first embodiment.

Next, the connection process of the dispatching part 20 will be described with reference to FIG. 7.

The third obtaining part 21*a* of the dispatching part 20 obtains the notification information outputted from the communication device 10. The calling judging part 21*c* of the dispatching part 20 judges whether or not the notification information is the third notification information (S 81).

Upon determining that the third notification information has been obtained (S 81, Yes), the calling judging part 21*c* sets (creates) the third calling information on the basis of the third notification information obtained by the third obtaining part 21*a* (S 82).

When determining that the notification information obtained by the third obtaining part 21*a* is not the third notification information (S 81, No), the calling judging part 21*c* checks whether the notification information obtained by the third obtaining part 21*a* is the first notification information (S 83).

When the notification information obtained by the third obtaining part 21*a* is the first notification information, it is detected whether the notification information of the other communication device 10 exists (S 84).

The calling judging part 21*c* confirms whether or not the other communication device 10 is outputting the second notification information (S 85).

Upon determining that the second notification information is not output (S 85, No), the calling judging part 21*c* sets (creates) the first calling information on the basis of the first notification information (S 86).

Upon determining that the second notification information is being output from the other communication device 10 (S 85, Yes), the calling judging part 21*c* sets (creates) the second calling information on the basis of the second notification information (S 87).

In the case where the notification information obtained by the third obtaining part 21*a* is not the first notification information and the third notification information (S 83, No), the calling judging part 21*c* checks whether it is the second notification information (S 88).

In the case where the notification information is the second notification information (S 88, Yes), the calling judging part 21*c* sets (creates) the second calling information on the basis of the second notification information (S 87).

In the case where the notification information obtained by the third obtaining part 21*a* is not matched with any of the first notification information, the second notification information, and the third notification information (S 88, No), the output of the fourth notification information is set (S 89).

Figure 8:
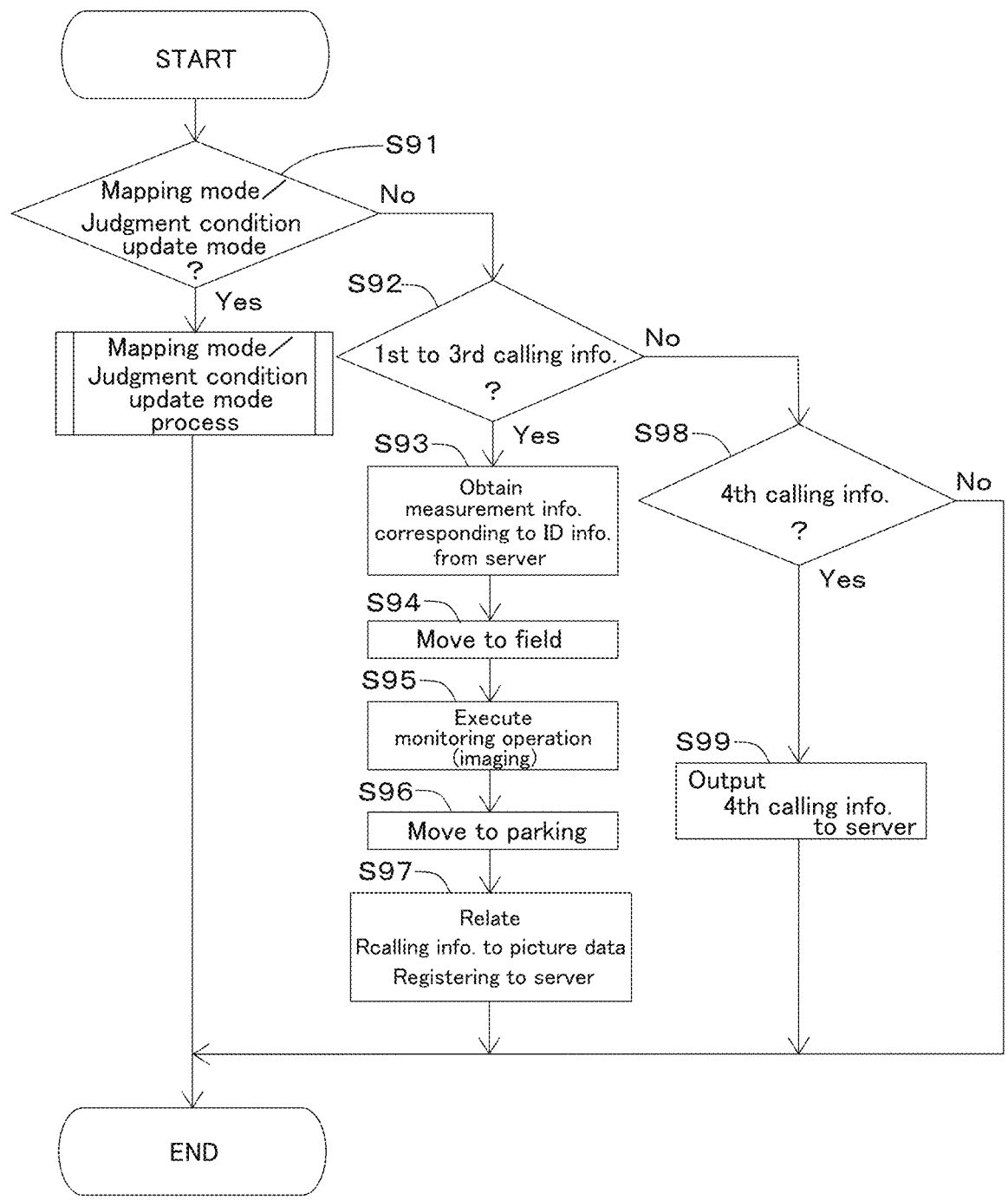
FIG. 8 is a view illustrating a sequential movement of a management machine according to the first embodiment.

Next, with reference to FIG. 8, a series of operations of the management machine 30 will be described. After the activation, the management machine 30 checks whether switching instruction for switching to the mapping mode or to the judgment condition update mode is transmitted from the server 50 (S 91).

When the management machine 30 determines that the signal receiving part 42*a* receives the switching instruction for switching to the mapping mode or to the judgement condition update mode is received from the server 50 (S 91, Yes), the management machine 30 shifts to the process of the mapping mode or the judgment condition update mode.

In the case where the management machine 30 determines that neither the mapping mode nor the judgment condition update mode is employed (S 91, No), the management machine 30 judges whether to be receiving the calling information (the first calling information, the second calling information, and the third calling information) (S 92).

In the case where the management machine 30 receives the calling information (S 92, Yes), the management machine 30 requests, to the server 50, the positioning information in the communication device 10 that outputted the notification information, and obtains the positioning information (S 93).

After obtaining the positioning information transmitted from the server 50, the management machine 30 moves, based on the positioning information, to the installation place of the communication device 10 that outputted the notification information (S 94).

After moving to the installation place of the communication device 10, the management machine 30 performs a predetermined operation on the basis of the calling information (S 95).

For example, the management machine 30 performs a warning operation by the warning operation 48 and/or a monitoring operation by the monitoring operation 47. To explain more specifically, the warning operation 48 issues a warning sound to warn the intruder M2. In the case where the monitoring part 47 is a video camera that captures a moving image, the monitoring part 47 captures the moving images around the communication device 10 that is a movement destination. The captured moving image data is associated with the identification information and stored in the management storage part 46.

After moving to a predetermined standby place 3*b* (S 96), the management machine 30 transmits, to the server 50, the information associating the moving image data and the identification information with each other through the management outputting part 42*b* and the fourth obtaining part 51*a* (S 97).

On the other hand, in the case where the management machine 30 has not received the calling information (S 92, No), the management machine 30 judges whether or not the fourth notification information has been received (S 98).

In the case where the fourth notification information is received (S 98, Yes), the management outputting part 42*b* of the management machine 30 transmits the fourth notification information to the server 50 (S 99).

Next, with reference to FIG. 9, the processes in the mapping mode and the judgment condition update mode by the management machine 30 will be described.

When the management machine 30 shifts to the process in the mapping mode or the judgment condition update mode, the management machine 30 moves to agricultural field 3 on the basis of the agricultural field information obtained from the server or the agricultural field information preliminarily stored in the management storage part 46 and of the positioning information detected by the position detecting part 41 (S101).

After moving to the agricultural field 3, the management machine 30 moves in the agricultural field 3. The management device 30 starts to detect the identification information outputted by the communication device 10 (S102).

When obtaining the identification information outputted by the communication device 10, the management device 30 judges whether there is a communication device that outputs unregistered identification information, on the basis of the obtained agricultural field information or the agricultural field information stored in the management storage part 46 (S103).

When the management device 30 determines that there is no communication device 10 that outputs the unregistered identification information (No in S103), the management device 30 terminates the mapping mode (S104).

When the management device 30 determines that there is a communication device 10 that outputs the unregistered identification information (Yes in S103), the management device 30 requests the connection to the communication device 10 that outputs the unregistered identification information (S105).

The communication device 10 that is requested to connect to the management device 30 and the management device 30 perform the connection for communication (S106).

The management device 30 communicates with the communication device 10 through the management outputting part 42b and the management receiving part 12a, and switches the communication device 10 to the mapping mode (S 107).

When the management device 30 switches the communication device 10 to the mapping mode, the first obtaining part 43 of the management device 30 obtains the identification information received by the signal receiving part 42a (S 109).

The second obtaining part 44 obtains the positioning information detected by the position detecting part 41 (S110).

The management machine 30 checks whether it is in the mapping mode (S 111).

When the management machine 30 determines that it is in the mapping mode (S 111, Yes), the management machine 30 checks, based on a threshold value preliminarily stored in the management storage part 46, whether the receiving strength of the identification information (a radio wave) obtained by the first obtaining part 43 is equal to or larger than a predetermined threshold (S 112).

In the case where the receiving strength of the obtained identification information is smaller than the predetermined threshold value (No in S112), the management machine 30 moves in the agricultural field 3 on the basis of the agricultural field information obtained from the storage part 52 of the server 50 through the server outputting part 51b and the signal receiving part 42a or the agricultural field information stored in the management storage part 46 (S 113).

In the case where the receiving strength of the obtained identification information is equal to or larger than the predetermined threshold value (S 112, Yes), the position detecting part 41 detects a position at the point where the intensity of the radio wave obtained by the first obtaining part 43 is equal to or larger than the predetermined threshold value, that is, obtains the positioning information of the current position (S 115).

The association part 45 associates the positioning information at a point where the intensity of the radio wave obtained by the first obtaining part 43 is equal to or larger than the predetermined threshold with the updated identification information (S 116).

The association information is stored in the management storage part 46 (S 117).

Or, the association information is temporarily stored in the management storage part 46 and transmitted to the server 50 through the management outputting part 42b and the fourth obtaining part 51a.

The management machine 30 requests the communication device 10 for which registration of the agricultural field information has been completed to update the identification information, through the management outputting part 42b and the receiving part 12a (S118).

After disconnection of communication with the communication device 10 (S 119), the management device 30 starts to detect the output of the other communication device 10 (S 102).

In the case where the management machine 30 determines that it is not in the mapping mode (S 111, No), that is, in the case of the judgment condition update mode, the management machine 30 outputs the update information to the communication device 10 (S 114).

The management machine 30 requests the communication device 10, whose update of the notification judgment condition has been completed, to update the identification information (S 118).

After disconnection of the communication with the communication device 10 (S 119), the management device 30 starts to detect the outputting of the other communication device 10 (S 102).

Next, with reference to FIG. 10, a series of operations of the server 50 will be described.

After the activation, the server 50 confirms whether an instruction for switching to the mapping mode is issued from the mobile terminal 60.

When the server 50 determines that an instruction for switching to the mapping mode (an agricultural field registration instruction) has been received (S 121, Yes), the registration instructing part 51b2 issues, to the management machine 30, an instruction for switching to the mapping mode (S 122).

The registration part 53 of the server 50 associates the agricultural field information with the association information and registers them to the storage part, the association information associating the positioning information transmitted from the management machine 30 with the updated identification information and in the storage part 52 (S 123).

When the server 50 determines that an instruction for switching to the mapping mode (an agricultural field registration instruction) has not been received from the mobile terminal 60 (S 121, No), the server 50 checks whether the fourth obtaining part 51a has obtained the calling information (S 124).

In the case where the server 50 determines that the calling information has been obtained (S 124, Yes), the server 50 specifies the positioning information of the communication device 10 that outputted the notification information, based on the calling information, the association information, and the agricultural field information, and transmits the positioning information of the communication device 10 that has outputted the calling information to the management machine (S125).

The server 50 obtains information associating the moving image data transmitted from the management machine 30 with the identification information (S 126).

When the server 50 determines that the calling information has not been received (S 124, No), the server 50 judges whether or not the fourth notification information has been obtained (S 127).

When the server 50 determines that the fourth notification information has been obtained (S 127, Yes), the registration part 53 associates the fourth notification information with the agricultural field information, and stores them to the storage part 52 (S 128).

The server 50 confirms whether the update information has been received from the mobile terminal 60 (S 129).

When the server 50 determines that the update information is received from the mobile terminal 60 (S 129, Yes), the update instruction part 51*b*1 transmits the update information to the management machine 30 and/or the dispatching part 20 (S 130).

As described above, the field management system 1 includes a plurality of communication devices 10, a signal reception part 42*a*, a position detection part 41, a first acquisition part 43, a second acquisition part 44 and an association part 45. According to this, only by setting a plurality of communication devices 10 in the field 3 and outputting the identification information to the management device 30, the identification information of the plurality of communication devices 10 and the identification information can be transmitted to the management device 30 Can be easily associated with each other.

In other words, by setting the plurality of communication apparatuses 10 in the field and moving the management apparatus 30 having the position detecting part 41, it is possible to acquire the field information in which the identification information of the communication apparatus 10 and the positioning information detected by the position detecting part 41 are associated You can create a map.

Further, the output part 12*b* outputs the identification information as a radio wave. Generally, radio wave output such as BLE etc. consumes less power for communication than other electric wireless communication devices. As a result, the identification information can be transmitted to the management machine 30 or the like with power saving. In addition, the communication device 10 can be easily managed after installation and installation.

Further, the output part 12*b* outputs the identification information as an optical signal. The communication device 10 such as an optical signal, for example, the infrared communication device 10 and the like has a feature that the secrecy of information to be output is low compared with the electric wireless communication device 10 and the like at low cost.

Thereby, it is easy to realize the installation of a large number of communication devices 10 in the field 3, and it is possible to prevent cracking or the like intervening in the field management system 1 from the outside illegally.

In addition, the associating part 45 associates the positioning information at the point where the intensity of the radio wave received by the first acquiring part 43 is equal to or more than the threshold and the identification information of the output part 12*b*. Thereby, based on the association information associated by the associating part, it is possible to accurately specify the position of the point where the individual communication device 10 is installed.

The associating part 45 associates the positioning information at the point where the intensity of the optical signal received by the first acquiring part 43 is equal to or larger than the threshold with the identification information of the output part 12*b*. Thereby, based on the association information associated by the associating part, it is possible to accurately specify the position of the point where the individual communication device 10 is installed.

Further, the output part 12*b* outputs the light emission pattern indicating the identification information of the plurality of communication devices 10. Thereby, it is possible to allocate optical signals to individual communication devices 10 without the identification information of the communication device 10 overlapping each other.

The field management system 1 includes a registration part 53 that associates the identification information and the positioning information of the communication device 10 correlated by the associating part 45 with the information of the field. Thus, it is possible to easily create a field map in which the identification information of the communication device 10 and the positioning information are associated with each field.

Further, the field management method includes a step of outputting identification information of the communication device 10 installed in the field 3, a step of the management machine 30 receiving the identification information, a step of positioning the management device 30 based on the signal from the positioning satellite A step of acquiring identification information of the communication device 10 received by the management device 30; a step of acquiring positioning information of the management device 30 detected by the management device 30; a step of acquiring positioning information of the management device 30 and associating the identification information of the communication device 10 acquired in the acquiring step with the positioning information of the management device 30 acquired in the step of acquiring the identification information of the communication device 30.

According to this, after installing a plurality of communication apparatuses 10 in the field, by merely moving the management apparatus 30 having the position detecting part 41, the identification information of the communication apparatus 10 and the positioning information detected by the position detecting part 41 It is possible to create an associated field map.

Further, the management machine 30 includes a main body 31*a* rotary wing 33 an arm 32, a signal receiving part 42*a*, a position detecting part 41, a first obtaining part 43, a second obtaining part 44 and an association part 45. This makes it easy to associate the identification information of the communication device 10 with the positioning information by merely causing the administrator 30 to fly over the field.

The field management system 1 has a plurality of communication devices 10, a third acquisition part 21*a*, a call determination part 21*c*, and a calling part 21*b*. As a result, the third acquisition part 21*a* can acquire the notification information output from the plurality of communication devices 10, and dispatch the management device 30 to the field according to the notification information.

Based on the notification information acquired by the third acquisition part 21*a*, the call determination part 21*c* calls the management device 30 to the installation location of at least one communication device 10 among the plurality of communication devices 10 that output the notification information. The management machine 30 can be dispatched in accordance with the notification information outputted from the communication device 10 installed in the field 3.

The communication device 10 includes a notification creation part 12*c* that creates notification information having different contents from the notification determination condition based on the physical quantity detected by the physical quantity detection part 11. Thereby, it is possible to estimate the necessity of dispatching the management machine 30 to the communication device 10 in which the abnormality was detected and the degree of urgency, based on the physical quantity detected by the physical quantity detection part 11 and the predetermined threshold value.

When a plurality of types of physical quantity detection parts 11 are provided in the communication apparatus 10, it is possible to estimate the cause of the abnormality based on the detected physical quantity and a predetermined threshold value.

The communication device 10 has a reception part 12a that acquires activation information. The notification determination condition is that when the reception part 12a receives the activation information, the notification information to be output from the output part 12b or the output of the output part 12b Includes conditions to change.

Thus, the output of the output part 12b in the communication device 10 can be changed. The communication device 10 can change the output of the output part 12b, that is, the output of the identification information and the notification information, depending on the situation. For example, when it is detected that the communication device 10 is carried away, by lowering the output of the output part 12b, communication from the communication device 10 to the outside can be temporarily stopped.

On the other hand, by raising the output of the output part 12b after the communication device 10 is taken away, the position of the carried-out communication device 10 can be conveyed.

The call determination part 21c creates call information having different contents from the call condition based on the plurality of notification information acquired by the third acquisition part 21a. According to this, according to a plurality of pieces of notification information, it is possible to stepwise decide whether or not to call the management machine 30 and notify the management machine 30 thereof.

The calling condition is a condition based on the combination of the content of the notification information and the notification information output from the plurality of communication devices 10. Thereby, it is possible to determine the communication device 10 with a high urgency of calling.

Also, in addition to being able to make a majority decision on the notification information outputted from each communication device 10, the management device 30 can be dispatched preferentially from the communication device 10 with a high urgency of calling.

The management machine 30 has a first obtaining part 43 that obtains the call information output by the calling part 21b, and moves to the field according to the call information. The call determination part 21c and the calling part 21b are provided in the server 50. The call determination part 21c creates call information based on the notification information output by the output part 12b, and the call part 21b transmits the call information to the server 50. As a result, the field 3 can be monitored with a configuration including at least the communication device 10, the dispatching part 20, and the management machine 30 without involving the server 50 or the like.

The field management method includes a step in which the physical quantity detection part 11 of the plurality of communication devices 10 installed in the field 3 detects a physical quantity, a step of outputting notification information based on the physical quantity detected by the physical quantity detection part 11, a step of acquiring the notification information outputted in the outputting step, a step of judging whether or not to call the management machine 30 based on the notification information acquired in the step of acquiring the notification information, a step of judging whether or not to call the management machine 30 and calling the management machine 30 when it is determined to call the management machine 30 in the step of determining whether or not the management machine 30 is to be called.

The physical quantity detection part 11 of the communication device 10 can dispatch the management machine 30 to the field according to the notification information according to the notification information set by the physical quantity.

Figure 13:
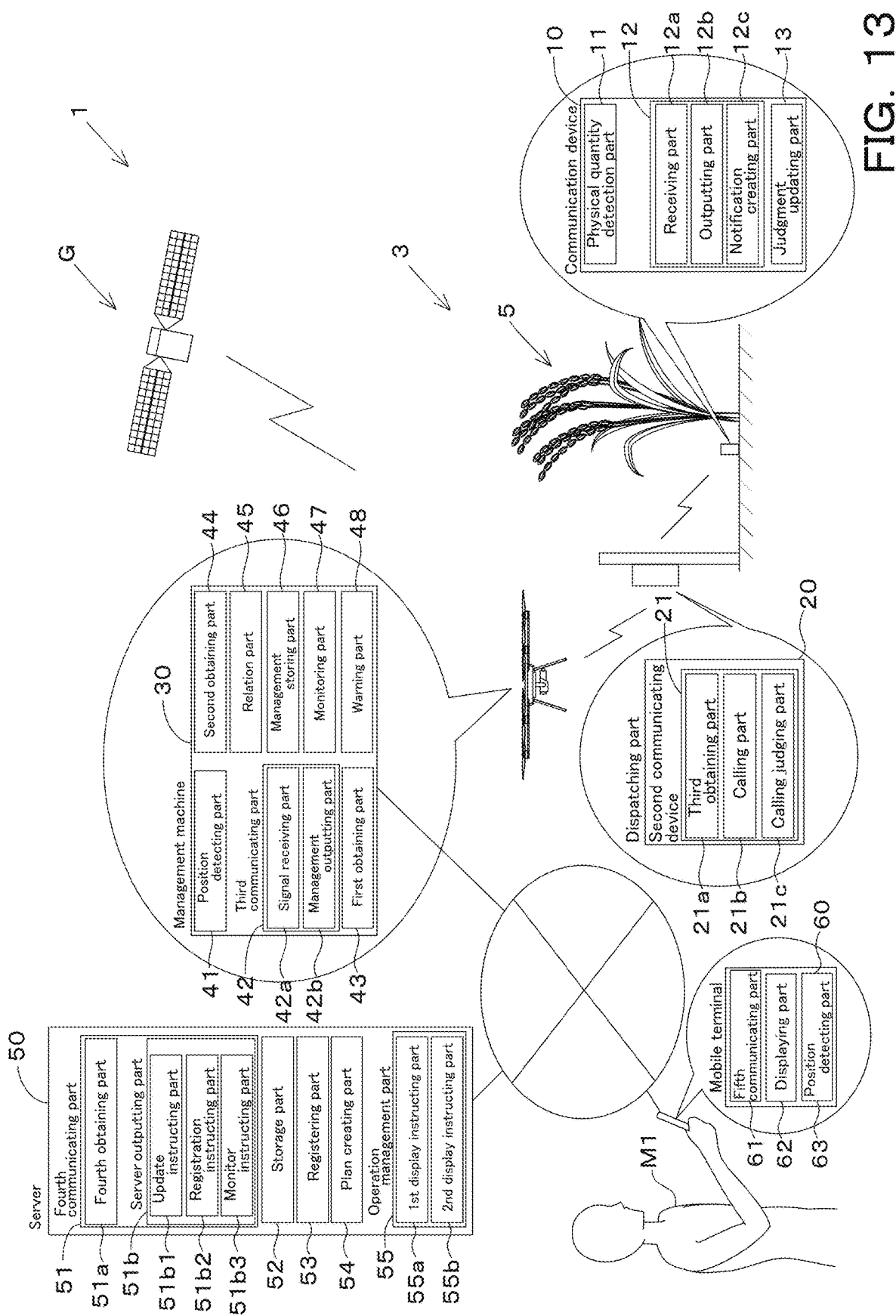
FIG. 13 is a view illustrating an overall of an agricultural field management system according to a second embodiment of the present invention.

FIG. 13 is an overall view of the field management system 2 of the second embodiment.

The field management system 2 of the second embodiment is applicable to the field management system 1 of the first embodiment described above. Explanation of the same configuration as in the first embodiment will be omitted.

As shown in FIG. 13, the server 50 has a work planning part 54 and a work management part 55. The work planning part 54 mainly creates contents of work in which field 3, which agricultural work is performed, and who performs the work. In this embodiment, at least the farming work done in the field 3 and the field 3, And creates work contents including workers who perform agricultural work.

Figure 17:
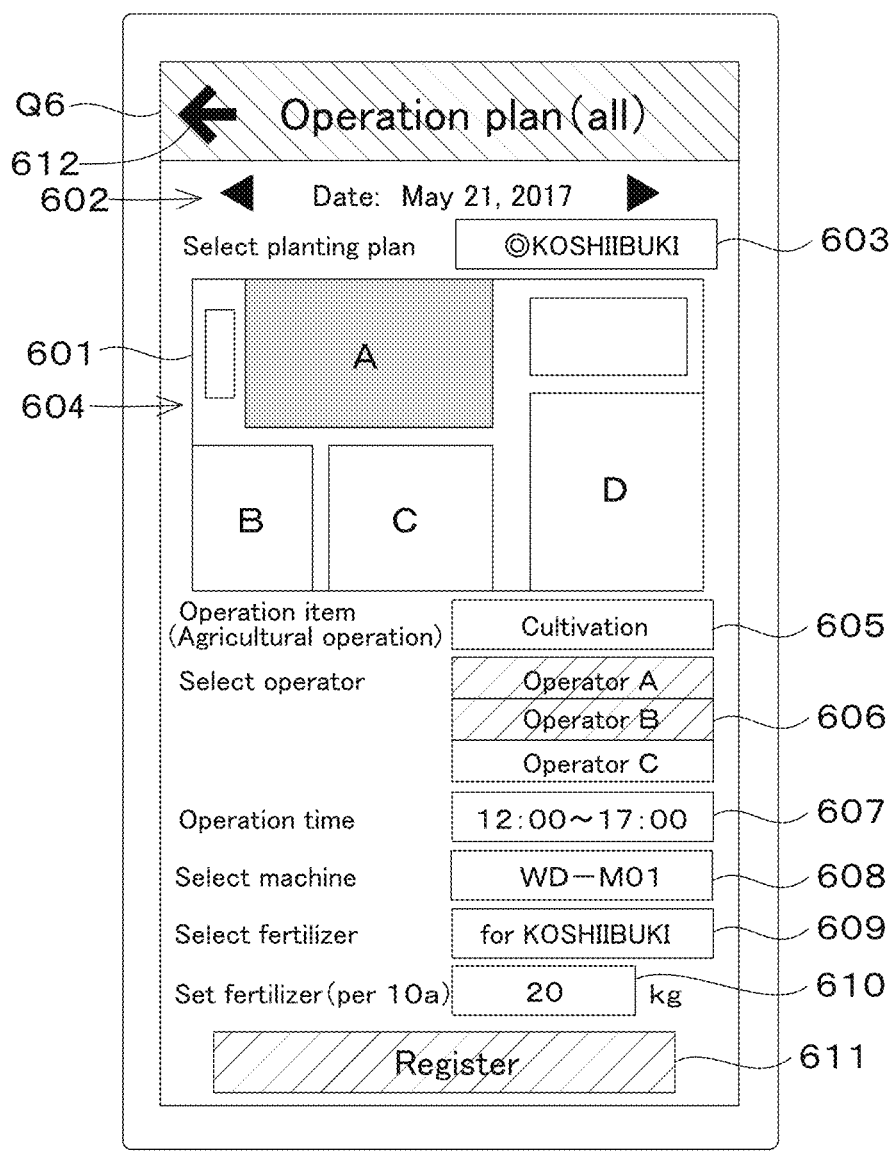
FIG. 17 is a view illustrating a display of an operation creating screen according to the second embodiment.
Figure 18:
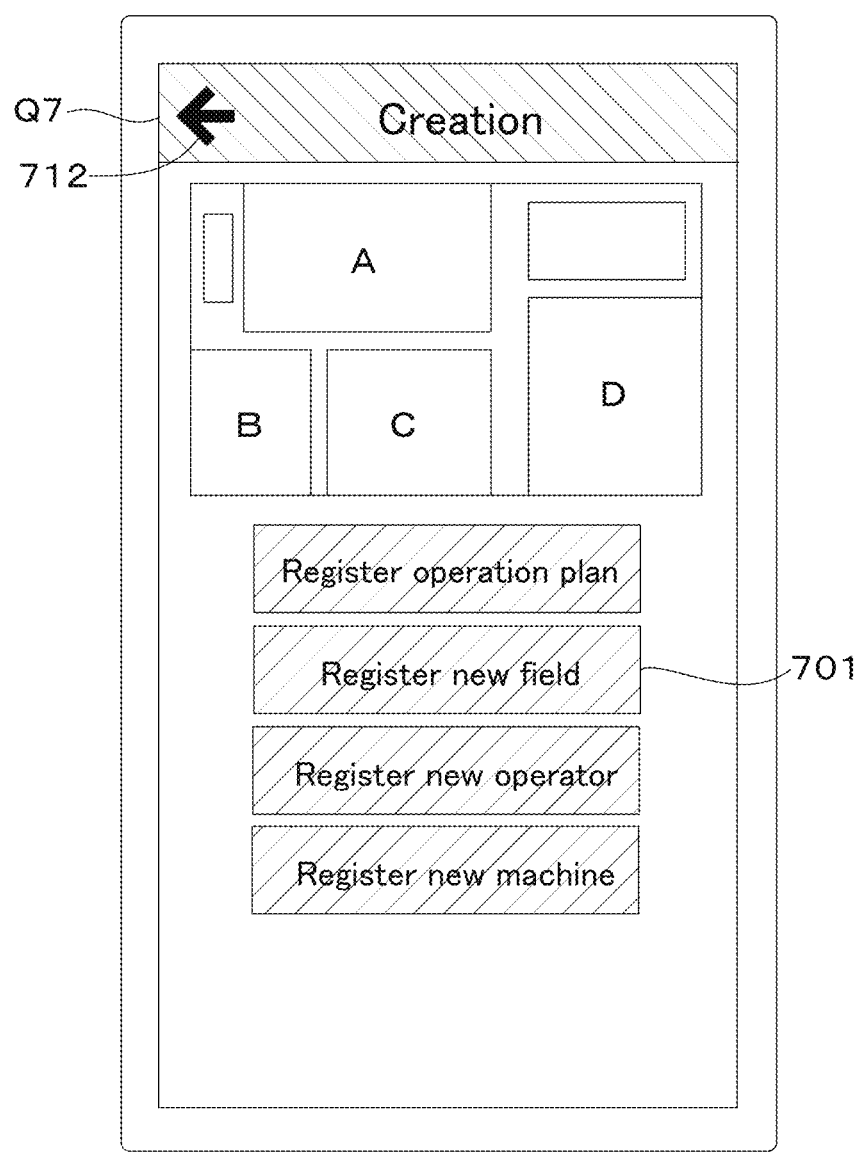
FIG. 18 is a view illustrating a creating screen according to the second embodiment.

As shown in FIG. 17, when the portable terminal 60 is connected to the server 50 and there is a request for creation of the work content from the mobile terminal 60, the work planning part 54 responds to this request to create work content Activates the plan creation screen Q6, and displays the plan creation screen Q6 on the mobile terminal 60.

With reference to FIG. 17, description will be given of the work content creation, the plan creation screen Q6, and the work planning part 54.

The work planning part 54 displays a date setting part 602 for setting the date of farm work on the plan creation screen Q6. In the date setting part 602, the date entered in the server 50 by the portable terminal 60 is displayed, and the entered date is the day of farm work.

The work planning part 54 displays the work plan selection part 603 for selecting the work plan on the plan creation screen Q6.

In the work plan selection part 603, a list of work plans (a list of names of work plans) acquired from the work plan database is shown, and a predetermined work plan can be selected from the list. For example, when "Tabuki" is selected in the work plan selection part 603, the work content created on the plan creation screen Q6 is associated with the work plan of "gushiki".

The work planning part 54 displays the field selection part 604 for selecting the field 3 on the plan creation screen Q6. The field selection part 604 shows a field map 601 based on the field information acquired by the server 50, and the field 3 on the field map 601 can be arbitrarily selected.

For example, when a portion indicating "Farm A" is selected among a plurality of fields 3 shown in the field selecting part 604, the selected "Farm A" becomes the field 3 in which farming is conducted.

The work planning part 54 displays a work selection part 605 for selecting agricultural work on the plan creation screen Q6. A plurality of agricultural work necessary for cultivating the crop 5 indicated by the work plan is shown in the work selecting part 605, and a predetermined agricultural work can be selected from a plurality of farm works.

For example, when "cultivation" is selected among a plurality of farm works (work items) shown in the work selection part 605, the selected "cultivation" is a farm work to be carried out.

The work planning part 54 displays the worker selection part 606 for selecting workers on the plan creation screen Q6. The worker registered in the server 50 in advance is shown in this worker selecting part 606. For example, when "worker B, worker C" is selected out of a plurality of workers indicated by the worker selecting part 606, the worker performed by the selected "worker B, worker C" (Implementer).

The work planning part 54 displays the time setting part 607 for setting the work time on the plan creation screen Q6. The time (for example, time) input to the server 50 by the portable terminal 60 is displayed in the time setting part 607, and the input time is the time for performing the work.

In addition, the work planning part 54 includes a machine selection part 608 for selecting an agricultural machine, a fertilizer selection part 609 for selecting a fertilizer (fertilizer name), and a scattering amount setting part 610 for setting an amount of fertilizer to be sprayed And displays it on screen Q6.

The machine selecting part 608 is a portion for setting the machine to be used in agricultural work. In the machine selection part 608, for example, the type and model of the agricultural machine registered in advance in the server 50, the type and model of the implement that can be connected to the agricultural machine, etc. are displayed, the displayed machine etc. can be selected.

In FIG. 17, it is shown that in the machine selection part 608, an implementation whose model is "WD-M 01" is set as the machine to be used.

In the fertilizer selection part 609, a plurality of fertilizer names registered in advance in the server 50 are displayed, and the selected fertilizer name is used in farming work. In the scattering amount setting part 610, the numerical value input to the server 50 by the mobile terminal 60 is displayed, and the input numerical value becomes the scattering amount.

When the work plan, the field 3, the farm work (work item), the worker, the work time, the fertilizer and the scattering amount are input and the registration button 611 is selected on the plan creation screen Q6, the work planning part 54 displays the plan creation screen Items entered in Q6 (field 3, agricultural work, worker, work time, fertilizer, scattering amount) are defined as work content, and the contents of this work are stored in the work content database in association with the work plan.

Also, when the registration button 611 is selected, as shown in FIG. 20, the display part 62 of the mobile terminal 60 transits to the home screen Q 1. When the return button 612 provided on the plan creation screen Q6 is selected, as shown in FIG. 20, the screen display of the display part 62 transits to the home screen Q1.

The work contents created by the work planning part 54 is not limited to those described above, and it is possible to set the spray amount of agricultural chemicals or pesticides to be used in the field 3, for example, and other farm work can be set You may do so.

The work management part 55 is a part for performing work management of agricultural work in the field 3. As shown in FIG. 13, the work management part 55 includes a first display instructing part 55a for displaying farm work in three fields of a field, a second display instructing part 55a for displaying detection information of the communication device 10 as monitoring information for each field 3.

Specifically, the first display instructing part 55a instructs the display part 62 of the mobile terminal 60 of the manager M1 to display the current position of the operator. The first display instruction part 55a requests the portable terminal 60 of the operator to transmit the positioning information.

In response to this, the position detecting part 63 of the mobile terminal 60 of the worker acquires the current position. The portable terminal 60 of the worker transmits the position information acquired by the position detection part 63 to the server 50. The fourth obtaining part 51a of the server 50 acquires the position information.

Based on the positioning information acquired by the fourth acquisition part 51a, the first display instruction part 55a instructs the mobile terminal 60 of the manager M1 to display the position information.

The second display instruction part 55b receives the detection information and the field information from the server 50. From the detection information, the call information and the position of the communication device 10 outputting the call information. Instructs the mobile terminal 60 of the manager M1 to display the monitoring status based on the communication device 10 outputting the call information and the call information from the received call information and the position of the communication device 10.

As shown in FIG. 14, on the home screen Q1, a field map 101, a creation button 102, a monitor button 103, a work display part 104 and a monitor display part 105 are displayed.

The mobile terminal 60 of the manager M1 receives the detection information and the field information from the server 50. From the detection information, the call information and the position of the communication device 10 outputting the call information. From the received call information and the position of the communication device 10, the communication device 10 outputting the call information is displayed in the field map 101 on the home screen Q1. Receives the positioning information of the mobile terminal 60 of the operator, and displays the current position of the operator in the field map 101.

For example, as shown in FIG. 14 and the like, "worker A" is displayed with a black star mark 101 a. "Worker C" is displayed with a white star mark 101b. It also receives the positioning information of the management machine 30 from the management machine 30 and displays the current position of the management machine 30 in the field map 101.

For example, as shown in FIG. 14 and the like, the management machine 30 is displayed with a simplified mark 101c of the management machine 30.

In the work display part 104, the work plan created by the work planning part 54 is displayed. More specifically, for example, each field 3 and the name of the worker scheduled to work in the field 3 are displayed. In the right part of the name of the worker, symbols and marks associated with the worker are displayed. For example, a black star mark 101 a is displayed on the right side of "worker A". A white star mark 101b is displayed on the right side of "worker C".

On the lower part of the work display part 104, the monitor display part 105 is displayed. When no call information is output, "No abnormality" is displayed on the monitor display part 105. When any of the communication devices 10 is outputting the call information, the installation location of the communication device 10 which outputs "dangerous", "semi-dangerous", etc. in the field map 101 is displayed.

Specifically, for example, the installation location of the communication device 10 that outputs "danger" is displayed with a dark triangular mark 101d. On the other hand, the installation location of the communication device 10 that outputs "semi-dangerous" is displayed with a triangular mark 101e of a light color.

Further, the monitoring display part 105 is displayed on the upper part of the work display part 104. The contents of the received call information are displayed on the monitor display part 105. More specifically, for example, among the call information, display with the highest degree of urgency in each field 3 is performed.

That is, when there is a communication device 10 that outputs "danger" and "semi-danger" in each field 3, "emergency" meaning "danger" having the highest degree of urgency is displayed on the upper right part.

In addition, as shown in FIG. 14 and the like, on the lower part of the monitor display part 105, the contents of each call information are displayed in the right part of the name of each field 3. "Emergency" meaning "danger" is displayed in the right part of "field A". "Alart" meaning "semi-danger" is displayed in the right part of "field D".

Further, when the monitoring button 103 on the home screen Q1 is selected, as shown in FIG. 20, the screen display of the display part 62 transitions to the field-wide monitoring situation screen Q2 as shown in FIG. 16A. In the monitoring situation screen Q2 shown in FIG. 16A, a field map 201, a monitor display part 205 of each communication apparatus 10, a management machine display part 207, and a return button 212 are displayed The field map 201 is displayed in the same manner as the field map 101 in the home screen Q1 described above. In the monitoring display part 205 of each communication device 10, a monitoring button 202 and a stop button 203 are displayed. The monitoring display part 205 of each communication device 10 is displayed under the monitoring button 202 and the cancel button 203. If the stop button 203 is selected, the monitoring is stopped.

That is, an instruction is transmitted from the mobile terminal 60 to the server 50 so as to cancel the monitoring mode. The server 50 having received the instruction to cancel the monitoring mode notifies the dispatching part 20 and the management machine 30 to that effect.

The dispatching part 20 instructed to stop the monitoring mode stops the reception of the information outputted from the communication device 10 and the output of the calling part.

The management machine 30 instructed to stop the monitoring mode returns to the standby location 3 a and waits. Incidentally, when the monitoring mode is canceled, as shown in FIG. 16C, the monitoring button 202 is displayed as the monitor button 204. When the return button 212 is selected, as shown in FIG. 20, the screen display of the display part 62 transitions to the home screen Q1.

In the lower part of the monitor display part 205 of each communication apparatus 10, the name of each management machine 30 and the management machine display part 207 are displayed. In the right part of the name of each management machine 30, "waiting", "in warning", "expressway", etc. indicating the current situation of the management machine 30 are displayed. "Waiting", "Under warning", "Express" while the name of the host field 3 to be dispatched is displayed on the right side. When the call information is being output, the contents of the received call information are displayed on the monitor display part 205 of each communication apparatus 10.

More specifically, for example, among the call information, display with the highest degree of urgency in each field 3 is performed. That is, in the case where there is the communication device 10 outputting "danger" and "semi-danger" in each field 3, "danger" having the highest degree of urgency is displayed on the right side of the monitoring information of the monitoring display part 205 of each communication device 10.

When each field 3 in the field map 201 is selected, the monitor display part 205 of each field 3 is displayed. The monitoring situation screen Q3 of each field displays the field map 301, the monitor display part 305 of each communication apparatus 10, the management machine display part 307, and the return button 312 as in the above-described overall monitoring situation screen Q2. When the return button 312 is selected, the screen display of the display part 62 transitions to the home screen Q1 as shown in FIG. 20.

When the call information is being output, the content of the received call information is displayed on the monitor display part 305 of each communication apparatus 10. More specifically, for example, among the call information, display with the highest degree of urgency in each field 3 is performed.

That is, when there is a communication device 10 that outputs "danger" and "semi-danger" among the communication devices 10, "danger" having the highest degree of urgency is displayed on the right of the monitoring information of the monitoring display part 305 of each communication device 10.

When the stop button 303 on the monitoring situation screen Q3 of each field is selected, the monitoring is stopped similarly to the above-described whole monitoring state screen Q2. Incidentally, when the monitoring mode is canceled, as shown in FIG. 16C, the monitoring button 302 is displayed as the monitoring button 304.

The field management system 2 can dispatch the management machine 30 and register a new field 3 based on the positioning information of the communication device 10 installed in advance in the field 3. When the creation button 102 of the home screen Q1 is selected, the screen display of the display part 62 transits to the creation screen Q7 as shown in FIG. 17.

Figure 19:
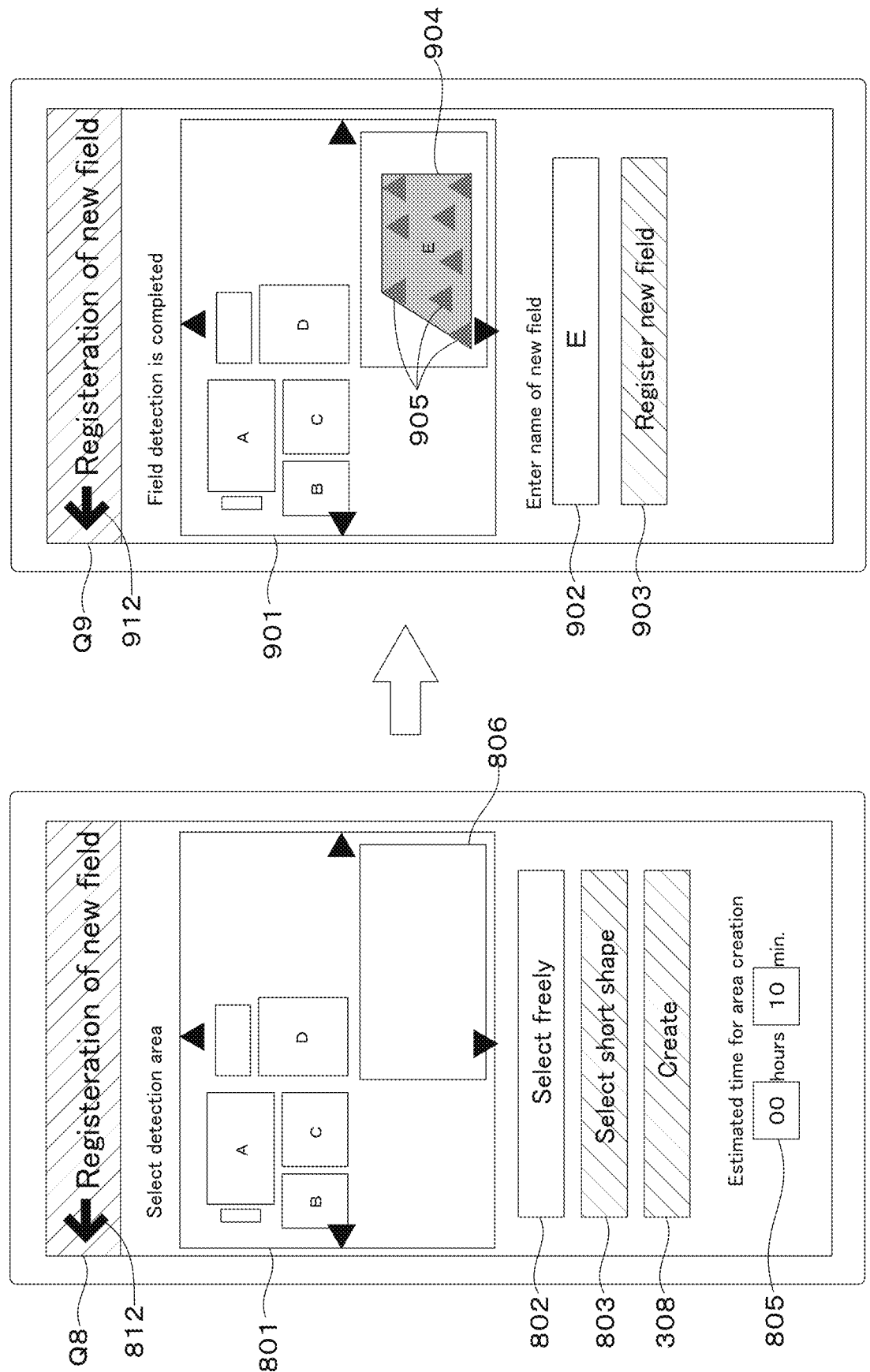
FIG. 19 is a view illustrating a display where a detection area is selected in a new agricultural field registration screen and a view illustrating a display where the agricultural field is detected in the new agricultural field registration screen according to the second embodiment.

When the field new registration 701 on the creation screen Q7 is selected, as shown in FIG. 20, the screen display of the display part 62 transitions to a field registration screen (creation screen) Q 8 as shown in FIG. 19. When the return button 712 provided on the creation screen Q7 is selected, as shown in FIG. 20, the screen display of the display part 62 transits to the home screen Q1.

On the field registration screen Q8 shown in FIG. 19, a field map 801, a free selection button 802, a short shape selection button 803, a dispatch button 804a prediction display part 805, and a return button 812 are displayed.

The field map 801 is a map displaying field information stored in advance in the storage part 52 of the server 50. For example, swipe the screen to the left (slide the finger touching the screen) and the map in the right direction of the field map 801 displayed on the display part 62 are displayed.

Further, a screen is swiped to the right (slide the finger touching the screen) and a map in the left direction of the field map 801 displayed on the display part 62 is displayed. Swipe the screen upward (slide the finger touching the screen) and the downward map of the field map 801 displayed on the display part 62 are displayed. Further, a screen is swiped down (slide the finger touching the screen) and a map in the upward direction of the field map 801 displayed on the display part 62 is displayed.

Also, pinch-in the screen (narrow two fingers touching the screen) and the field map 801 are reduced and displayed. In addition, pinch-out the screen (spreading two fingers touching the screen) and the field map 801 are enlarged and displayed.

Either one of the free selection button 802 and the short shape selection button 803 can be selected. By selecting the free selection button 802, it is possible to designate a range to dispatch the management machine 30.

More specifically, when the free selection button 802 is selected, it is possible to freely specify the range enclosed by the fingers of the field map 801 displayed on the screen. That is, when tracing with the finger so as to surround the field 3 to be newly registered on the field map 801, it is possible to specify a rough place of the field 3 to be newly registered.

If the short shape selection button 803 is selected, the range to dispatch the management machine 30 can be specified within a short shape range. More specifically, when the short shape selection button 803 is selected, a short shape range 806 in which a portion at which a finger has been released from the screen after swiping is set as a diagonal is taken as a starting point from a portion where the field map 801 displayed on the screen is tapped Can be specified. That is, by swiping around the field 3 to be newly registered on the field map 801, the rough place of the field 3 to be newly registered can be selected within the short range.

The prediction display part 805 is the time until the positioning of the positions of all the communication devices 10 installed in the field 3 newly registered by the management machine 30 is completed. The expected time is calculated based on the area of the range 806 selected by the free selection button 802 or the short shape selection button 803 and the like described above.

After selecting the dispatch button 804, the registration instruction part 51b2 instructs the management machine 30 to register the field 3 with respect to the range (selection range 806) selected by the above-described free selection or short shape selection. That is, the registration instructing part 51b2 transmits to the management machine 30 a switching instruction to the mapping mode and field information (the position of the field registered in the server 50 in advance) corresponding to the selection range 806.

The management machine 30 measures the position of the communication device 10 installed in the field 3 according to the same procedure as the mapping mode in the first embodiment. When the return button 812 provided on the field registration screen Q8 is selected, as shown in FIG. 20, the screen display of the display part 62 transits to the home screen Q1.

When the management machine 30 positions the installation position 905 of all the communication devices 10 installed in the field 3 to be newly registered, the display of the screen is updated to the field registration screen Q9.

As shown in FIG. 19, on the field registration screen Q9, a field map 901, a name input part 902, and a registration decision button 903 are displayed. In the field map, the expected range 904 of the field 3 to be newly registered and the installation position 905 of the communication device 10 are displayed.

For example, the installation position 905 of the communication device 10 is displayed with a triangle mark. By swiping each vertex of the predicted range 904 of the field 3 to be newly registered, it is possible to change the predicted range 904 of the field 3 to be newly registered.

The name input part (name part) can be selected by long tapping the screen (keep holding the screen long with the finger). The selected name part can input and edit a character by keyboard input or the like.

When the registration decision button 903 is selected, the new field information is transmitted from the mobile terminal 60 to the server 50. That is, if the registration decision button 903 is selected, the field name input to the name input part 902, the positioning information in the management machine 30, and the identification information of the communication apparatus 10 are associated as field information, and the server 50 is provided with a storage part 52 (registered) at the same time.

The field management system 2 includes a plurality of communication devices 10, a position detection part 41 provided in the management device 30, a registration part 53 to register in the storage part 52, and a work plan based on the fields registered in the storage part 52 And a work planning part 54 to be created.

According to this, the identification information of the plurality of communication devices 10 installed in the field 3 and the positioning information detected by the management machine 30 can be registered together with the field, and the position (positioning information) of the registered communication device 10 can be registered It is possible to make a plan by the work planning part 54 using the field map.

For example, since a plurality of communication devices 10 are installed in one field 3, the field 3 can be virtually divided into a plurality of areas according to the number of the communication devices 10, divided into a plurality of areas Work in accordance with the work plan can be carried out in the field 3.

The server 50 includes a registration instructing part 51b2 for outputting a field registration instruction, the plurality of communication apparatuses 10 has a receiving part 12a for receiving a field registration instruction, and the output part 12b includes a field in accordance with the registration instruction, the identification information is outputted.

According to this, since the communication apparatus 10 can receive the field registration instruction by the registration support part 51b2, it is possible to easily register the field.

The management machine 30 has a signal receiving part 42a that receives a field registration instruction. In response to the field registration instruction received by the signal receiving part 42a, the position detecting part 41 detects the positioning information.

According to this, since the management apparatus 30 can receive the field registration instruction by the registration support part 51b2, it is possible to easily register the field.

Further, the field management system 2 includes a plurality of communication devices 10, and a server 50 having a fourth acquisition part 51a and a storage part 52.

According to this, since the server 50 can acquire and store the physical quantity information detected by the physical quantity detection part 11 of the communication device 10 and the identification information of the communication device 10, the server 50 can acquire information on the surroundings of the communication device 10 It is possible to grasp the situation from the physical quantity information. That is, it is possible to easily grasp the situation of the field 3.

The server 50 has a monitoring instructing part 51b3 and the communication device 10 has a receiving part 12a for receiving the monitoring instruction output from the monitoring instructing part 51b3. When the receiving part 12a receives the monitoring instruction, the output part 12b outputs detection information of the communication device 10.

According to this, the server 50 can monitor the field 3 by the monitoring instructing part 51b3, that is, monitor the situation around the communication apparatus 10.

The server 50 has at least a work management part 55 for managing the work of agricultural work at the field, and the work management part 55 has a first display instructing part 55a for displaying farm work for each field, a first display instructing part 55a for detecting the communication device 10 and a second display instruction part 55b for displaying information as monitoring information.

According to this, it is possible to display the agricultural work currently performed for each field and the monitoring information in the field. For example, during farm work, it is possible to ascertain from the monitoring information that a dangerous situation has occurred in a predetermined area.

In the above description, the embodiment of the present invention has been explained. However, all the features of the embodiment disclosed in this application should be considered just as examples, and the embodiment does not restrict the present invention accordingly. A scope of the present invention is shown not in the above-described embodiment but in claims, and is intended to include all modifications within and equivalent to a scope of the claims.

What is claimed is:

1. An agricultural field management system comprising:
    a plurality of communication devices arranged in an agricultural field, each having at least a detector configured to detect a physical quantity indicating dynamic movement of people, animals and objects;
    a relay arranged in the agricultural field and configured to communicate with each of the communication devices;
    a management apparatus configured to move in the agricultural field and to communicate with the relay, wherein
    each of the communication devices is configured to, based on the physical quantity,
        generate first notification information indicating a danger to the each of the communication devices, and transmit the first notification information to the relay, and
        generate second notification information indicating an emergency having an urgency degree higher than the danger of the first notification information to the each of the communication devices, defer to transmit the second notification information to the relay until receiving activation information from the relay, and transmit the second notification information to the relay upon receiving the activation information, and
    the relay is configured to move the management apparatus to one of the communication devices which transmits the first notification information or the second notification information.

2. The agricultural field management system according to claim 1, wherein
    the relay receives a combination of the first notification information and/or the second notification information transmitted from the communication devices, and moves the management apparatus based on the combination of the first notification information and/or the second notification information to the communication devices.

3. The agricultural field management system according to claim 1, wherein
    the relay is configured, upon receiving the activation information, to request for connection with one or more of the communication devices from which the second notification information is not received, and the one or more of the communication devices requested for connection increases power of the second notification information and transmits the second notification information to the relay.

4. The agricultural field management system according to claim 1, wherein
    the second notification information from one or more of the communication devices indicates that the one or more of the communication devices are being taken away or destroyed.

5. The agricultural field management system according to claim 1, comprising a server configured to communicate with the relay and management apparatus, wherein the server transmits the activation information.

6. The agricultural field management system according to claim 1, comprising a mobile terminal configured to communicate with the relay and management apparatus, wherein the mobile terminal transmits the activation information.

7. The agricultural field management system according to claim 1, wherein
    the relay is configured to obtain positioning information of each of the communication devices.

8. The agricultural field management system according to claim 1, wherein
    the management apparatus is configured to capture moving images around the communication devices after moving thereto.

9. The agricultural field management system according to claim 1, wherein
    wherein the management apparatus is a multicopter configured to fly above the agricultural field.

10. An agricultural field management method comprising:
    detecting a physical quantity indicating dynamic movement of people, animals and objects by means of a plurality of communication devices arranged in an agricultural field;
    communicating between each of the communication devices and a relay;
    communicating between the relay and a management apparatus;
    generating by means of each of the communication devices, first notification information indicating a danger to each of the communication devices based on the detected physical quantity;
    transmitting the first notification information from each of the communication devices to the relay;
    generating by means of each of the communication devices, second notification information indicating an emergency having an urgency degree higher than the danger of the first notification information to each of the communication devices based on the detected physical quantity;
    deferring to transmit the second notification information to the relay until receiving activation information from the relay;
    transmitting the second notification information to the relay upon receiving the activation information; and
    moving the management apparatus to one of the communication devices which transmits the first notification information or the second notification information.

* * * * *